United States Patent
Jung et al.

(10) Patent No.: US 9,237,419 B2
(45) Date of Patent: Jan. 12, 2016

(54) METHOD FOR REPORTING POSITION INFORMATION TOGETHER WITH OTHER INFORMATION IN A WIRELESS COMMUNICATION SYSTEM AND APPARATUS FOR SUPPORTING SAME

(71) Applicant: LG Electronics Inc., Seoul (KR)

(72) Inventors: Sung Hoon Jung, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/347,936

(22) PCT Filed: Oct. 8, 2012

(86) PCT No.: PCT/KR2012/008128
§ 371 (c)(1),
(2) Date: Mar. 27, 2014

(87) PCT Pub. No.: WO2013/051912
PCT Pub. Date: Apr. 11, 2013

(65) Prior Publication Data
US 2014/0235271 A1 Aug. 21, 2014

Related U.S. Application Data

(60) Provisional application No. 61/545,126, filed on Oct. 8, 2011.

(51) Int. Cl.
*H04W 4/02* (2009.01)
*H04W 64/00* (2009.01)

(52) U.S. Cl.
CPC ............... *H04W 4/02* (2013.01); *H04W 64/00* (2013.01)

(58) Field of Classification Search
CPC ........ H04W 4/02; H04W 64/00; H04W 24/10
USPC .......................... 455/450, 422.1, 550.1, 456.1
See application file for complete search history.

(56) References Cited

U.S. PATENT DOCUMENTS

2010/0330921 A1* 12/2010 Kim et al. ................... 455/67.11
2013/0050356 A1*  2/2013 Stathem et al. ................ 347/85

FOREIGN PATENT DOCUMENTS

| KR | 10-2011-0093642 A | 8/2011 |
| WO | WO 2011083802 A1 * | 7/2011 |
| WO | 2011-093681 A2 | 8/2011 |
| WO | 2011-097729 A1 | 8/2011 |
| WO | WO 2011097729 A1 * | 8/2011 |
| WO | 2011-106284 A2 | 9/2011 |

OTHER PUBLICATIONS

"Location Information Acquisition for MDT", Research in Motion; 3GPP TSG RAN WG2 Meeting #69, R2-101472, Feb. 26, 2010.

* cited by examiner

*Primary Examiner* — Nathan Taylor
(74) *Attorney, Agent, or Firm* — Dentons US LLP

(57) ABSTRACT

According to one aspect of the present invention, a reporting method in a wireless communication system is provided. The method comprises: determining a service state; controlling positioning for acquiring position information based on the service state; acquiring information on the position of a terminal according to the positioning mode determined by said controlling; and reporting the acquired position information to a network.

11 Claims, 20 Drawing Sheets

METHOD FOR REPORTING POSITION INFORMATION TOGETHER WITH OTHER INFORMATION IN A WIRELESS COMMUNICATION SYSTEM AND APPARATUS FOR SUPPORTING SAME

This application is a 35 USC §371 National Stage entry of International Application No. PCT/KR2012/008128 filed on Oct. 8, 2012, and claims priority to U.S. Provisional Application No. 61/545,126, filed Oct. 8, 2011, all of which are incorporated by reference in their entirety herein.

BACKGROUND OF THE INVENTION

1. Field of the Invention

The present invention concerns wireless communications, and more specifically, to a method of reporting location information alongside other information, in a wireless communication system, and a method of supporting the same.

2. Related Art $3^{rd}$ generation partnership project (3GPP) long term evolution (LTE) which is improvement of a universal mobile telecommunications system (UMTS) is introduced as 3GPP release 8. The 3GPP LTE uses orthogonal frequency division multiple access (OFDMA) in a downlink and uses single carrier-frequency division multiple access (SC-FDMA) in an uplink. Multiple input multiple output (MIMO) having maximum four antennas are adopted. In recent years, 3GPP LTE-advanced (LTE-A) which is an evolution of the 3GPP LTE has been discussed.

MDT (minimization of driving tests) means that service providers test user equipments instead of vehicles in order for coverage optimization. Coverage varies depending on the location of the base station, arrangement of surrounding buildings, and users' use environments. Accordingly, a service provider periodically needs to do driving tests and requires bunch of costs and resources. MDT is that a service provider measures coverage using a user equipment.

MDT may be divided into logged MDT and immediate MDT. According to logged MDT, a user equipment delivers a logged measurement after performing MDT measurement to a network at a specific time. Immediate MDT lets a user equipment transfer a measurement to a network when reporting conditions are met after MDT measurement is carried out. Logged MDT conducts an MDT measurement in an RRC idle mode while immediate MDT does in an RRC connected mode.

A service provider may prepare for a coverage map that indicates a service's quality distribution and whether a service is available over his/her entire service area by compiling the MDT measurements received from several user equipments and may utilize the coverage map for network operation and optimization. For example, when reported a coverage issue regarding a specific region from a user equipment, a service provider may expand coverage of the corresponding local cell by increasing transmit power of the base station providing services to the corresponding area.

In case a user equipment that has performed an MDT measurement may be available for reporting with the user equipment's location information upon measurement, the user equipment may send the location information together with the measurement result to a network. The user equipment may conduct a positioning procedure in order to obtain the location information while doing MDT measurement. Meanwhile, the user equipment may consume much power while fulfilling the positioning procedure. In comparison, usefulness of the location information reported alongside the measurement result is not always high. Accordingly, a need exists for a reporting method that enables the optimization between reducing the user equipment's power consumption and reporting location information that is critical for operating a network.

SUMMARY OF THE INVENTION

An object of the present invention is to provide a method of reporting location information alongside other information in a wireless communication system and an apparatus of supporting the same.

In an aspect, a reporting method in a wireless communication system is provided. The reporting method includes determining a service state, controlling positioning for obtaining location information depending on the service state, obtaining information on a location of a user equipment depending on a positioning mode determined by the control, and reporting the obtained location information to a network.

The reporting method may further include receiving a measurement configuration including information for performing measurement from the network. The measurement configuration may include a specific threshold. The determining the service state may include measuring a serving cell and at least one neighbor cell to obtain a measurement result and comparing a quality of the serving cell with the threshold.

The controlling the positioning may include activating the positioning when the quality of the serving cell is lower than the threshold and deactivating the positioning when the quality of the serving cell is higher than the threshold.

The obtaining the information on the location of the user equipment depending on the determined positioning mode may be performed when the positioning is activated.

The obtained location of the user equipment may be logged alongside the measurement result and is reported to the network.

The reporting method may further include monitoring a downlink quality.

The determining the service state may include sensing an occurrence of a radio link failure based on the monitoring.

The controlling the positioning may include activating the positioning when the radio link failure is sensed.

The determining the service state may further include determining that the user equipment recovers from the radio link failure when the user equipment performs RRC (Radio Resource Control) connection reestablishment.

The controlling the positioning may include deactivating the positioning when determining recovery from the radio link failure.

The reporting method may further include sending, to the network, a radio link failure report reporting that the radio link failure is sensed. The radio link failure report may include the information on the location of the user equipment.

In another aspect, a wireless device operating in a wireless communication system is provided. The wireless device includes a Radio Frequency (RF) unit transmitting and receiving a radio signal and a processor operatively connected with the RF unit. The processor is configured to determine a service state, control positioning for obtaining location information depending on the service state, obtain information on a location of a user equipment depending on a positioning mode determined by the control and report the obtained location information to a network.

According to an embodiment of the present invention, a user equipment may selectively activate or deactivate positioning as necessary, and may control a positioning mode. Accordingly, the user equipment might obtain location information at the time when it determines that location information is needed and might not conduct positioning for obtaining location information at the time when it determines that the location information is not needed. Or, the user equipment may perform positioning for obtaining exact location information depending on a service condition or may perform other modes of positioning for acquiring relatively brief location information. By doing so, the user equipment may save power consumed to obtain location information depending on circumstances, which may result in the user equipment being more flexible in light of its operation. Further, the location information reported to a network may be assured for its accuracy depending on service conditions, so that even when the frequency or performance of positioning is deteriorated, the operational performance of the network may be maintained.

DESCRIPTION OF EXEMPLARY EMBODIMENTS

Figure 1:
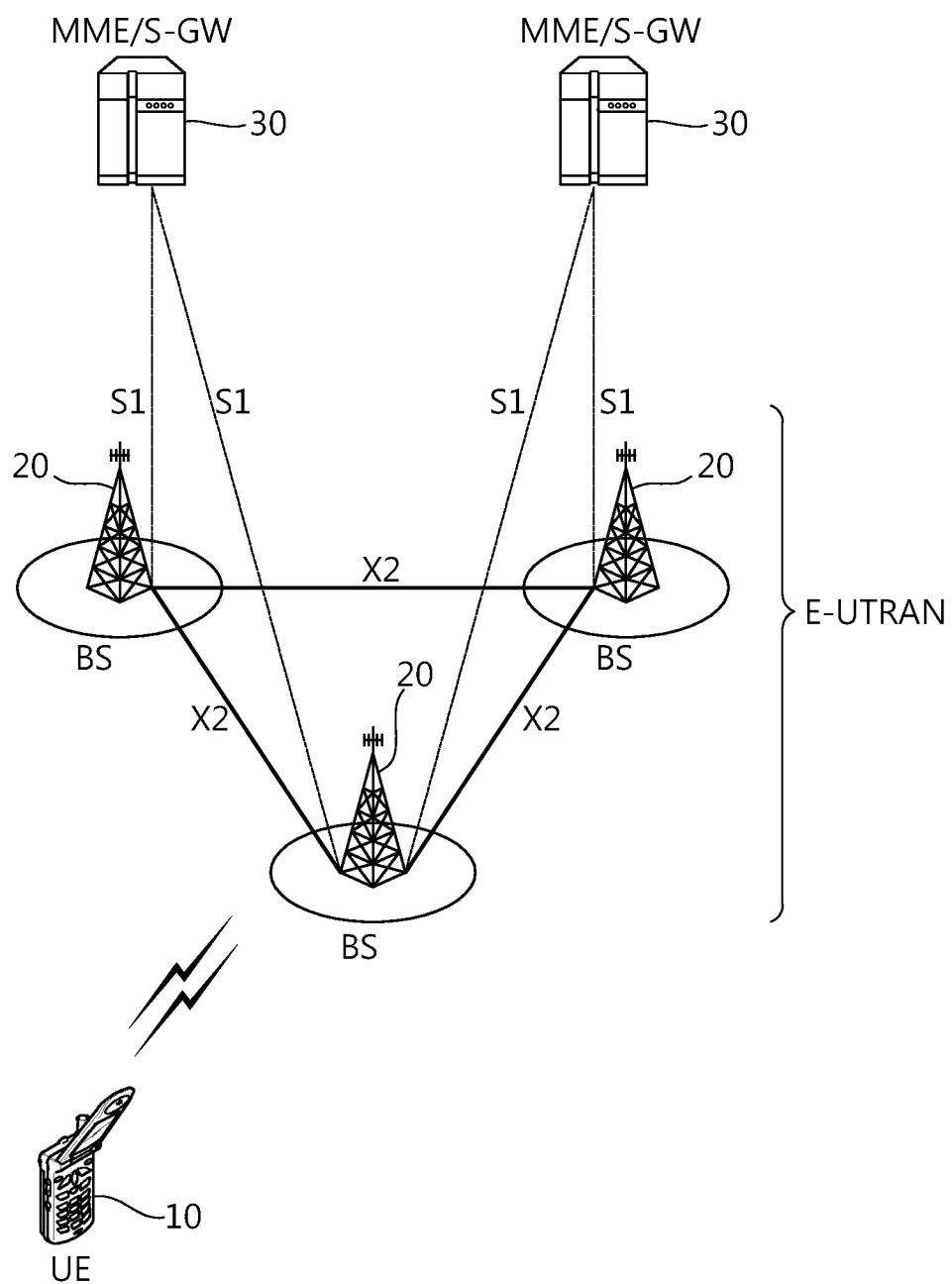
FIG. 1 illustrates a wireless communication system according to the present invention.

FIG. 1 illustrates a wireless communication system according to the present invention. The wireless communication system may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an SI-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. To this end, the RRC layer exchanges an RRC message between the UE and the base station.

Figure 2:
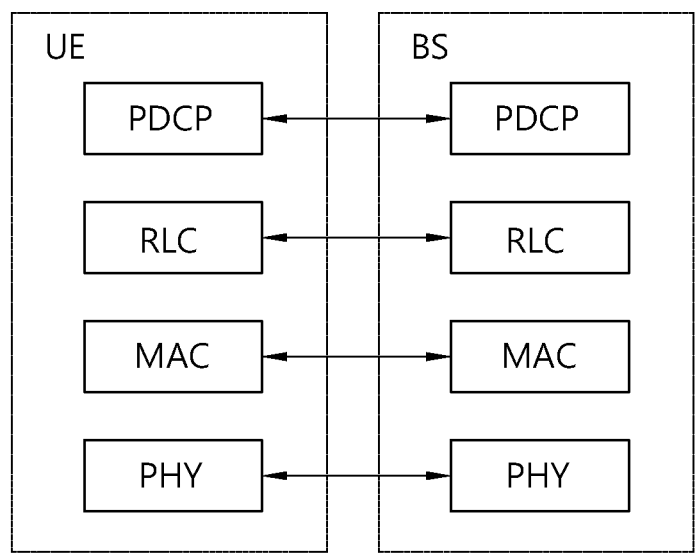
FIG. 2 is a block diagram illustrating a radio protocol architecture for a user plane.
Figure 3:
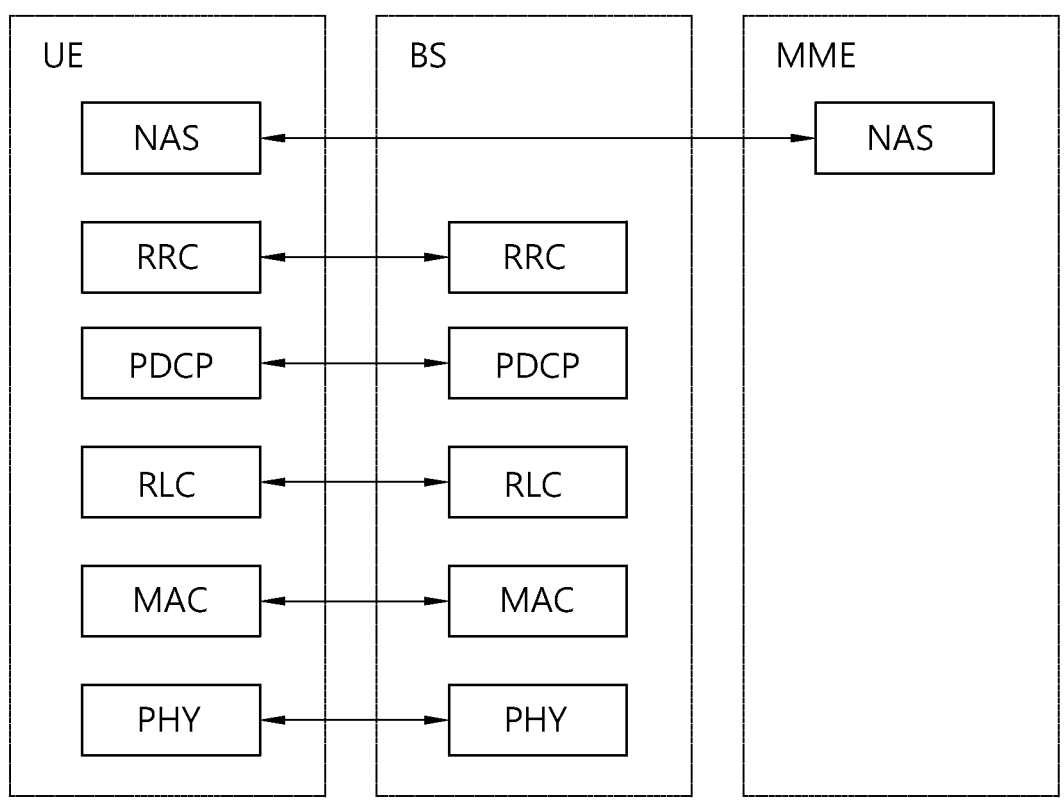
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of sub-carriers in a frequency domain. One sub-frame is constituted by the plurality of OFDM symbols in the time domain. A resource block as a resource allocation unit is constituted by the plurality of OFDM symbols and the plurality of sub-carriers. Further, each sub-frame may use specific sub-carriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer located above the RRC layer performs functions such as session management and mobility management.

In order to manage mobility of the UE on the NAS layer, two states of EPS mobility management (EMM)-REGISTERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009 September) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on a uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.

1) Limited service: The service may provide an emergency call and an earthquake and Tsunami warning system (ETWS), and provide the emergency call and the earthquake and Tsunami warning system (ETWS) in an acceptable cell.

2) Normal service: The service may mean a public use general service and may provide the public use general service in a suitable or normal cell.

3) Operator service: The service may mean a service for a communication network operator and only the communication network operator may use the cell and a general user may not use the cell.

The type of the cell may be divided as below in association with the service type provided by the cell.

1) Acceptable cell: Cell where the UE may receive the limited service. The cell is a cell that is not barred in terms of the corresponding UE and satisfies a cell selection criterion of the UE.

2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.

3) Barred cell: The cell is a cell where information indicating that the corresponding cell is a cell barred through the system information is broadcasted.

4) Reserved cell: The cell is a cell where information indicating that the corresponding cell is a cell reserved through the system information is broadcasted.

Figure 4:
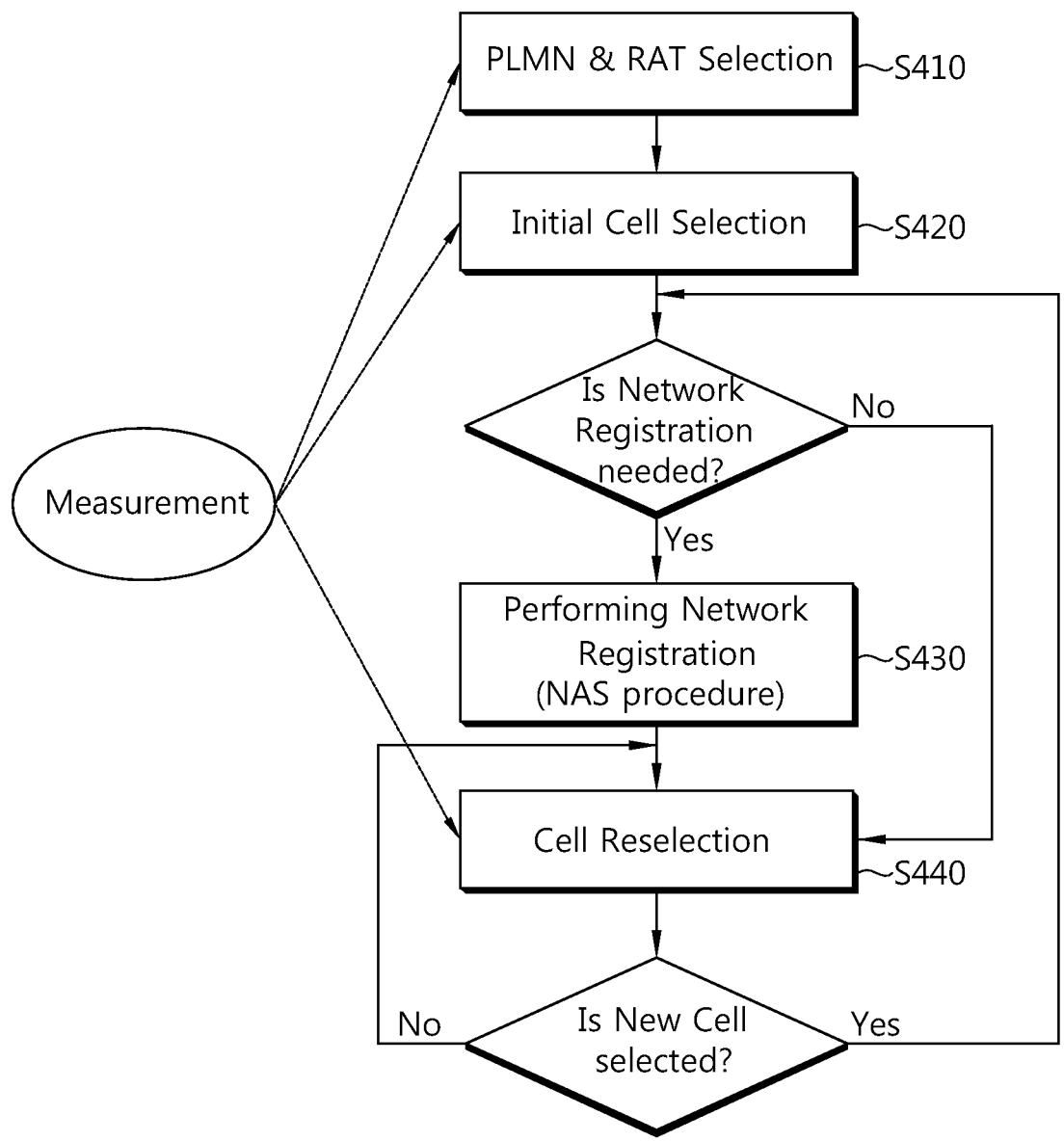
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (S430). The UE registers its own information (e.g., IMSI) in order to receive a service (e.g., paging) n from the network. The UE does not register the information in the accessed network whenever selecting the cell, and registers the information when information (e.g., a tracking area identity (TAI) of the network that receives from the system information) is different from information on a network known by the UE).

The UE performs the cell reselection based on a service environment provided by the cell or an environment of the UE (S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
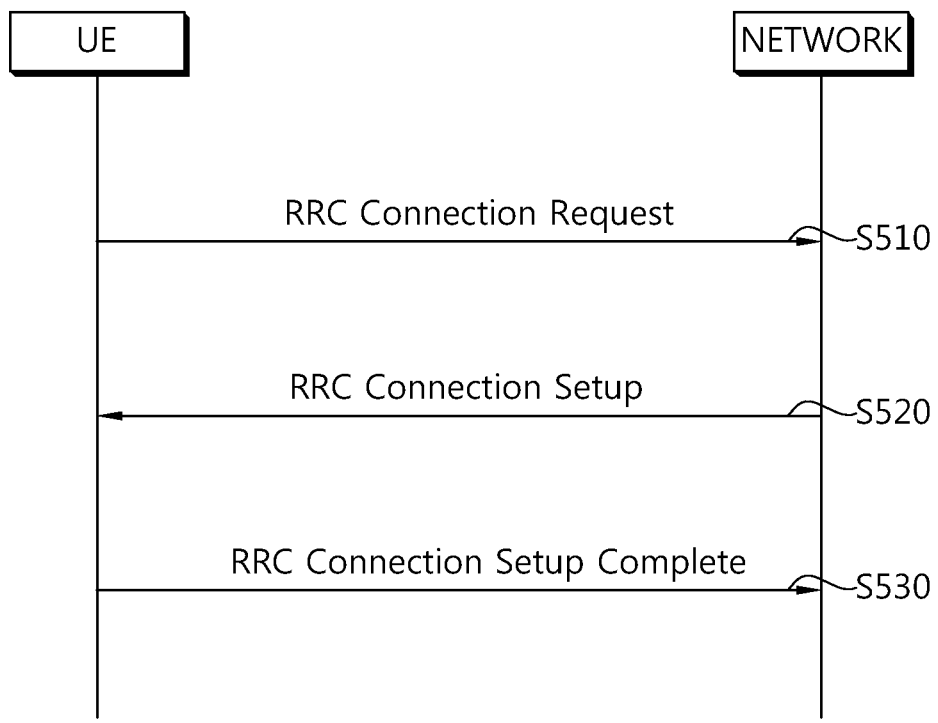
FIG. 5 is a flowchart illustrating a process of establishing an RRC connection.

FIG. 5 is a flowchart illustrating a process of establishing an RRC connection.

The UE sends to the network an RRC connection request message for requesting the RRC connection (S510). The network sends an RRC connection setup message as a response to the RRC connection request (S520). The UE enters an RRC connection mode after receiving the RRC connection setup message.

The UE sends to the network an RRC connection setup complete message used to verify successful completion of establishing the RRC connection (S530).

Figure 6:
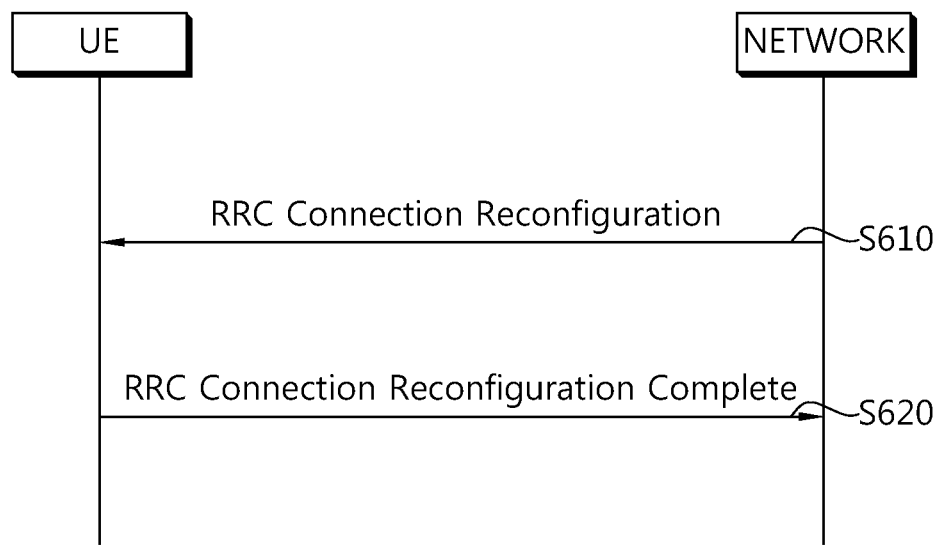
FIG. 6 is a flowchart illustrating a process of reconfiguring the RRC connection.

FIG. 6 is a flowchart illustrating a process of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (S610). The UE sends to the network an RRC connection reconfiguration complete message used to verify successful completion of establishing the RRC connection reconfiguration as a response to the RRC connection reconfiguration (S620).

Next, a procedure in which the UE selects the cell will be described in detail.

When the power of the UE is turned on or the UE stays in the cell, the UE performs procedures for receiving the service by selecting/reselecting a cell having appropriate quality.

The UE in the RRC idle state needs to prepare for receiving the service through the cell by continuously selecting the cell having the appropriate quality. For example, the UE of which the power is just turned on needs to select the cell having the appropriate quality for registration in the network. When the UE in the RRC connection state enters the RRC idle state, the UE needs to select a cell to stay in the RRC idle state. As such, a process in which the UE selects a cell that satisfies a predetermined condition in order to stay in a service stand-by state such as the RRC idle state is referred to as the cell selection. Since the UE performs the cell selection while the cell in the RRC idle state may not be decided at present, it is important to select the cell rapidly as possible. Therefore, in the case of a cell that provides radio signal quality having a predetermined reference or more, even though the cell is not a cell that provides the best radio signal quality for the UE, the cell may be selected in the cell selection process by the UE.

Hereinafter, a method and a procedure for selecting the cell by the UE in the 3GPP LTE will be described in detail with reference to 3GPP TS 36.304 V8.5.0 (2009 March) "User Equipment (UE) procedures in idle mode (Release 8)".

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. The respective PLMNs may be identified by a mobile country code (MCC) and a mobile network code (MNC). PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service). However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

The cell selection process is generally divided into two types.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select another that provides higher quality. When the cell is again selected as such, a cell that provides higher signal quality than the currently selected cell is generally selected. The process is referred to as the cell reselection. The cell reselection process generally has a basic object to select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselect a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which in-cell UEs will commonly apply through broadcast signaling or provide a frequency-dedicated priority for each UE through UE-dedicated signaling.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, the ranking performed during the cell reselection evaluating process will be described.

A ranking criterion used to give the priority of the cell is defined as illustrated in Equation 1.

$$R_S = Q_{meas,s} + Q_{hyst}, R_n = Q_{meas,n} - Q_{offset}$$ [Equation 1]

Herein, Rs represents a ranking criterion of the serving cell, Rn represents a ranking criterion of the neighboring cell, Qmeas,s represents a quality value which the UE measures for the serving cell, Qmeas,n represents a quality value which the UE measures for a neighboring cell, Qhyst represents a hysteresis value for the ranking, and Qoffset represents an offset between two cells.

In an intra-frequency, when the UE receives an offset Qoffsets,n between the serving cell and the neighboring cell, Qffoset=Qoffsets,n and when the UE does not receive Qoffsets,n, Qoffset=0.

In an inter-frequency, when the UE receives the offset Qoffsets,n fir the corresponding cell, Qoffset=Qoffsets,n+Qfrequency and when the UE does not receive Qoffsets,n, Qoffset=Qfrequency.

When the ranking varies while the ranking criterion Rs of the serving cell and the ranking criterion of the neighboring cell Rn are similar to each other, the ranking is frequently reversed, and as a result, the UE may alternatively reselect both cells. Qhyst represents a parameter for preventing the UE from alternatively reselecting both cells by giving hysteresis in cell reselection.

The UE measures the Rs of the serving cell and the Rn of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, Radio Link Monitoring (RLM) is described.

A user equipment monitors downlink quality based on a cell-specific reference signal for sensing downlink radio link quality of a PCell. The user equipment estimates downlink radio link quality for the purpose of monitoring the downlink radio link quality of the PCell and compares the estimated result with thresholds Qout and Qin. The threshold Qout is defined as a level where a downlink radio link cannot be received stably, and this corresponds to a 10% error block error rate of hypothetical PDCCH transmission taking into account a PDFICH error. The threshold Qin is defined as a downlink radio link quality level at which reception may be made more stable than at the Qout level, and this corresponds to a 2% block error rate of hypothetical PDCCH transmission considering a PCFICH error.

A radio link failure is now described.

A user equipment continues to perform measurement in order to maintain quality of a radio link with a serving cell receiving a service. The user equipment determines whether communication is impossible under current circumstance due to a quality deterioration of a radio link with the serving cell. If the quality of the serving cell is too low and thus communication is nearly impossible, the user equipment determines the current circumstance as being at a radio link failure.

If it is determined a radio link failure, the user equipment abandons communication with the current serving cell and chooses a new cell through a cell selection (or cell reselection) procedure, then attempting to do RRC connection re-establishment to the new cell.

3GPP LTE standards provide the following as examples of normal communication being impossible:

When determined that the user equipment has a serious problem with the downlink communication link quality based on a radio quality measurement result of the user equipment's physical layer (when determined that PCell's quality is low while performing RLM)

When determined that there is a problem with uplink transmission due to continuous failures in random access procedure in the MAC sublayer.

When determined that there is a problem with uplink transmission due to continuous failures in uplink data transmission in RLC sublayer.

When determined that handover has failed.

When the message received by the user equipment fails to pass integrity test.

Hereinafter, an RRC connection re-establishment procedure is described in greater detail.

Figure 7:
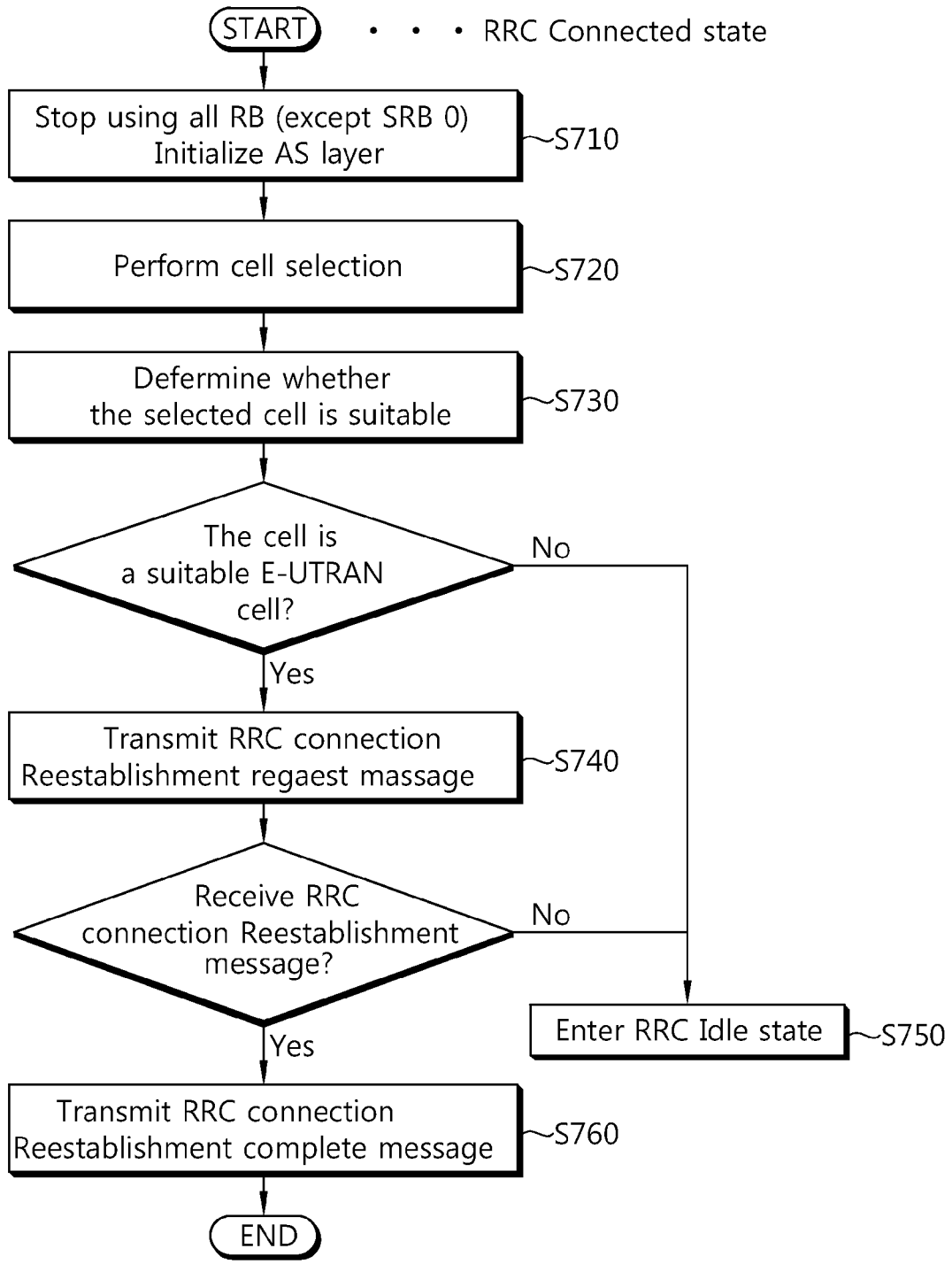
FIG. 7 is a view illustrating an RRC connection re-establishment procedure.

FIG. 7 is a view illustrating an RRC connection re-establishment procedure.

Referring to FIG. 7, a user equipment stops using all configured radio bearers except SRB 0 (Signaling Radio Bearer #0) and initializes various sublayers of the Access Stratum (AS) (S710). Further, the user equipment sets each sublayers and physical layer as default configurations. During this course, the user equipment maintains an RRC connected state.

The user equipment performs a cell selection procedure for fulfilling an RRC connection re-establishment procedure (S720). The cell selection procedure of the RRC connection re-establishment procedure may be carried out like the cell selection procedure that is performed by the user equipment in an RRC idle state.

The user equipment determines whether a corresponding cell is a proper cell by checking system information of a corresponding cell after performing the cell selection procedure (S730). In case the selected cell is determined to be a proper E-UTRAN cell, the user equipment sends an RRC connection re-establishment request message to a corresponding cell (S740).

Meanwhile, in case it is determined that the cell selected through a cell selection procedure for performing an RRC connection re-establishment procedure is a cell using other RAT than E-UTRAN, the RRC connection re-establishment procedure is stopped and the user equipment enters into the RRC idle state (S750).

The user equipment may be implemented to finish identifying a cell's properness within a limited time by a cell selection procedure and receiving system information of the selected cell. For this, the user equipment may drive a timer as it initiates the RRC connection re-establishment procedure. The timer may be paused in case the user equipment is determined to have selected a proper cell. In case the timer expires, the user equipment deems the RRC connection re-establishment procedure as failing and may enter into the RRC idle state. This timer, hereinafter, is referred to as a radio link failure timer. In LTE standards TS 36.331, a timer named T311 may be put to use as the radio link failure timer. The user equipment may acquire the timer's set value from the system information of the serving cell.

When receiving the RRC connection re-establishment request message from the user equipment and accepting the request, the cell sends out an RRC connection re-establishment message.

When receiving the RRC connection re-establishment message from the cell, the user equipment reconfigures an RLC sublayer and a PDCP sublayer on SRB1. Further, the user equipment re-calculates various key values related to security setting and reconfigures a PDCP sublayer in charge of security with the newly calculated security key values. By doing so, SRB1 between the user equipment and the cell is opened and an RRC control message may be exchanged. The user equipment completes resuming SRB1 and sends an RRC connection re-establishment complete message indicating the RRC connection re-establishment procedure to the cell (S760).

In contrast, when receiving the RRC connection re-establishment request message from the user equipment and not accepting the request, the cell sends to the user equipment an RRC connection re-establishment reject message.

If the RRC connection re-establishment procedure is successfully performed, the cell and the user equipment conduct an RRC connection re-establishment reconfiguration procedure. Accordingly, the user equipment turns back to the state before performing the RRC connection re-establishment procedure and maximally guarantees service continuity.

Description related to an RLF report comes next.

The user equipment, if an RLF or handover failure occurs, reports such failure event to the network in order to support the network's Mobility Robustness Optimization (MRO).

When reestablishing RRC connection, the user equipment may offer an RLF report to an eNB. Radio measurement included in the RLF report may be used as potential cause of failure so as to identify coverage issues. This information may be used in MRO evaluation for intra-LTE mobility connection failure, in order to exclude such events and put other events to use as inputs for other algorithms.

In case RRC connection re-establishment fails or the user equipment fails to perform RRC connection re-establishment, the user equipment may make reconnection in the idle mode and then generate a valid RLF report for the eNB. For such purpose, the user equipment may store information regarding the latest RLF or handover failure, and until the RLF report is brought up by the network or for 48 hours after the RLF or handover failure is sensed, may inform the LTE cell that RLF report is valid at every subsequent RRC connection (re)establishment and handover.

The user equipment maintains the information while it undergoes a state shift and RAT varies, and after back to the LTE RAT, indicates again that RLF report is valid.

The RLF report being valid in the RRC connection configuration procedure is to indicate that the user equipment is interfered, like going through connection failure, and due to such failure, the RLF report is not yet delivered to the network. The RLF report from the user equipment contains the following information:

Last cell that has offered service to the user equipment (in case of RLF) or target's E-CGI in handover. Unless E-CGI has been known, PCI and frequency information are used instead.

E-CGI of the cell where reestablishment has been attempted.

E-CGI of the cell that provided service to the user equipment upon initialization of the last handover, as an example, when message 7 (RRC connection reconfiguration) was received by the user equipment.

Elapsed time from last handover initialization to connection failure.

information indicating whether connection failure is attributed to RLF or handover failure.

Radio measurements.

failure's position.

When receiving the RLF failure from the user equipment, the eNB may forward the report to the eNB that provided service to the user equipment before the reported connection failure.

In a mobile communication system, it is inevitable for a user equipment to support mobility. Accordingly, the user equipment continuously measures quality for a serving cell currently providing service and quality for a neighbor cell. The user equipment reports a measurement result to the network at a proper time, and the network provides the optimal mobility to the user equipment through, e.g., handover. The measurement for such purpose is often referred to as Radio Resource Management (RRM) measurement.

The user equipment, in order to provide information helping a service provider to operate a network in addition to the purpose of supporting mobility, may perform measurement for a specific purpose configured by the network and report a measurement result to the network. For example, the user equipment receives broadcast information of a specific cell determined by the network. The user equipment may report the serving cell with a cell identifier of the specific cell (this is also referred to as a global cell identifier), information for identifying the location where the specific cell belongs (for example, Tracking Area Code), and/or other cell information (for example, whether a Closed Subscriber Group (CSG) cell is a member).

When the user equipment, which is on the move, identifies that quality of a specific area is very bad through measurement, the user equipment may report the location information on the band-quality cells and measurement result to the network. The network may achieve its optimization based on the measurement result reports from the user equipments helping operating the network.

In a mobile communication system having a frequency reuse factor of 1, mobility may be mostly attained between different cells that belong to the same frequency band. Accordingly, in order to insure the user equipment's mobility well, the user equipment should be able to measure well cell information and quality of neighbor cells having the same center frequency as the serving cell. As such, measurement on the cell having the same center frequency as the center frequency of the serving cell is referred to as intra-frequency measurement. The user equipment conducts intra-frequency measurement and reports the measurement result to the network at a proper time, so that the goal corresponding to the measurement result can be achieved.

A mobile service provider may operate a network using a plurality of frequency bands. In case a communication system service is offered through a plurality of frequency bands, the user equipment, in order for the optimal mobility to be provided to the user equipment, should be able to measure well cell information and quality of neighbor cells having different center frequencies than the center frequency of the serving cell. As such, measurement on the cell having a different center frequency than the center frequency of the serving cell is referred to as inter-frequency measurement. The user equipment should be able to conduct inter-frequency measurement and report the measurement result to the network at a proper time.

In case the user equipment supports measurement on a heterogeneous network, measurement on a cell in the heterogeneous network may be conducted by the base station configuration. Such measurement on the heterogeneous network is referred to as inter-Radio Access Technology (RAT) measurement. For example, the RAT may include GSM EDGE Radio Access Network (GERAN) and UMTS Terrestrial Radio Access Network (UTRAN) observing the 3GPP standards, as well as CDMA 2000 systems that follow the 3GPP2 standards.

Figure 8:
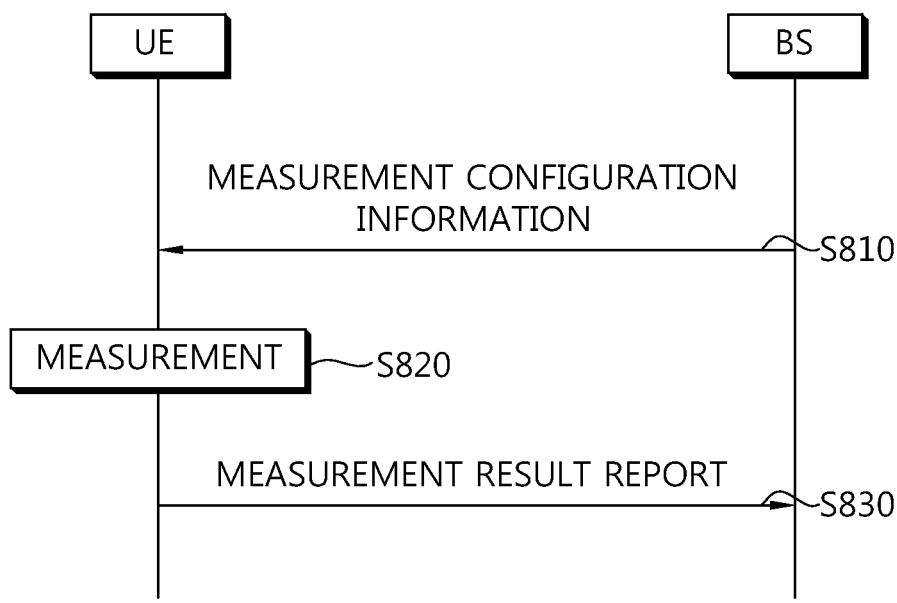
FIG. 8 is a flowchart illustrating a conventional method of performing measurement.

FIG. 8 is a flowchart illustrating a conventional method of performing measurement.

The user equipment receives measurement configuration information from the base station (S810). A message containing the measurement configuration information is referred to as a measurement configuration message. The user equipment conducts measurement based on the measurement configuration information (S820). The user equipment reports a measurement result to the base station if the measurement result meets a reporting condition in the measurement configuration information (S830). A message containing the measurement result is referred to as a measurement report message.

The measurement configuration information may contain the following information:

(1) measurement object information: information regarding an object on which the user equipment is to conduct measurement. The measurement object includes at least any one of an intra-frequency measurement object that is an intra-cell measurement object, an inter-frequency measurement object that is an inter-cell measurement object, and an inter-RAT measurement object that is an object of inter-RAT measurement. For example, the intra-frequency measurement object may indicate a neighbor cell having the same frequency band as the serving cell, the inter-frequency measurement object may indicate a neighbor cell having a different frequency band from the serving cell, and the inter-RAT measurement object may indicate a neighbor cell of a different RAT from a RAT of the serving cell.

(2) Reporting configuration information: information on the reporting condition and type as to when the user equipment reports a measurement result. The reporting condition may contain information regarding a period or event triggering a measurement result report. The reporting type is information as to what type a measurement result is configured in.

(3) measurement identifier information: information on a measurement identifier linking a measurement object with a reporting configuration to thereby determine in what type the user equipment is to report on what measurement object. The measurement identifier information is contained in a measurement report message, thus able to indicate what measurement object the measurement result is about and in what reporting condition the measurement report is generated.

(4) Quantity configuration information: information on a parameter for configuring the unit of measurement, unit of reporting, and/or filtering of a measurement result value.

(5) measurement gap information: information on a measurement gap that is not scheduled for downlink or uplink transmission and may be thus used only for measurement without the user equipment considering data transmission with the serving cell.

The user equipment has a measurement object list, a reporting configuration list and a measurement identifier list to perform a measurement procedure.

In 3GPP LTE, a base station may configure for a user equipment only one measurement object per frequency band. According to 3GPP TS 36.331 V8.5.0 (2009 March) "Evolved Universal Terrestrial Radio Access (E-UTRA) Radio Resource Control (RRC); Protocol specification (Release 8)" Ch. 5.5.4, events triggering a measurement report are defined as shown in the following table.

TABLE 1

| Event | Reporting Condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the user equipment's measurement result meets a configured event, the user equipment sends a measurement report message to the base station.

Figure 9:
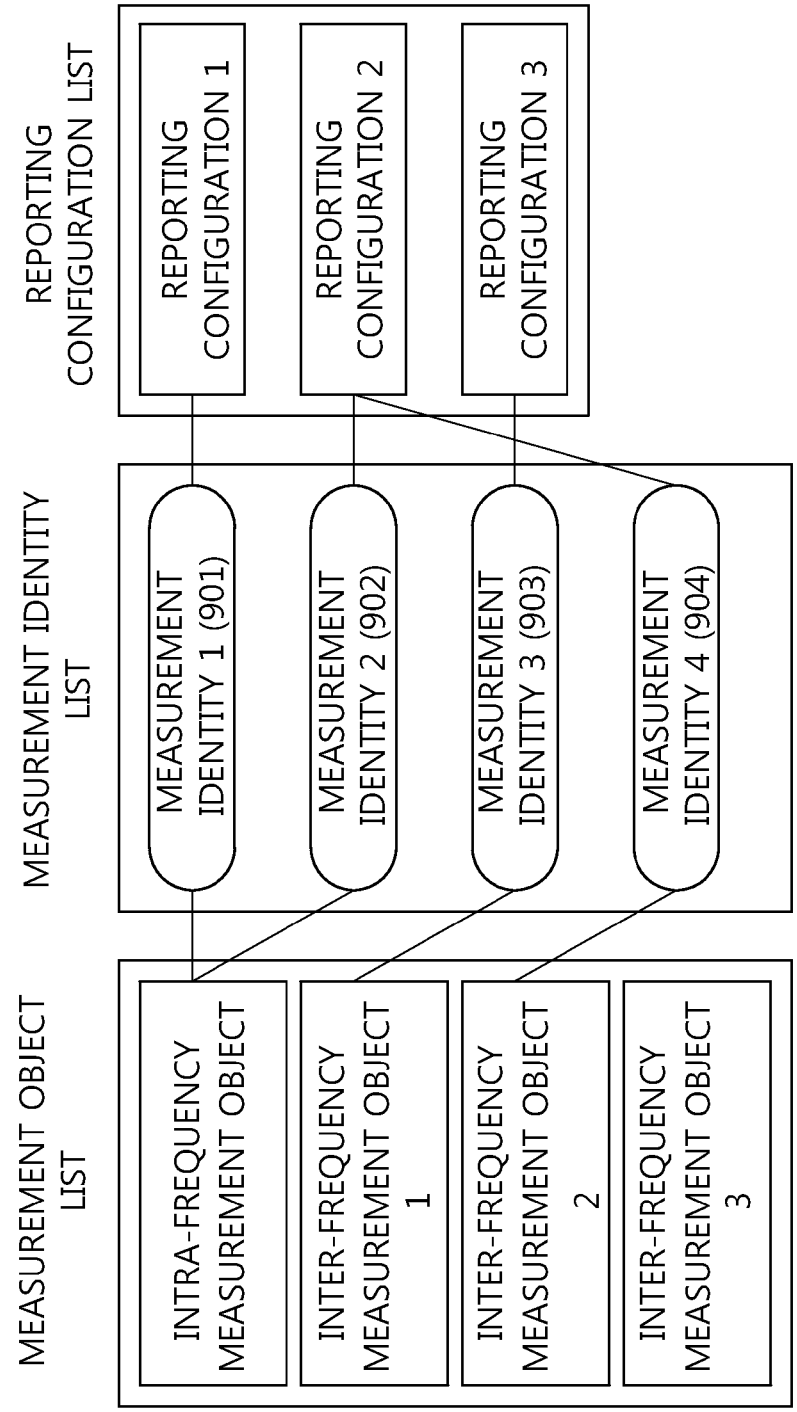
FIG. 9 shows an example of a measurement configuration configured in a user equipment.

FIG. 9 shows an example of a measurement configuration configured in a user equipment.

First, measurement identifier 1 links an intra-frequency measurement object with reporting configuration 1 901. The user equipment conducts intra-frequency measurement and uses reporting configuration 1 for determining a reference of a measurement result report and reporting type.

Measurement identifier 2 902, like measurement identifier 1, is linked with an intra-frequency measurement object, but links the intra-frequency measurement object with reporting configuration 2. The user equipment conducts measurement and uses reporting configuration 2 for determining a reference of measurement result report and reporting type.

By measurement identifier 1 901 and measurement identifier 2 902, the user equipment sends a measurement result on the intra-frequency measurement object as long as the measurement result satisfies either reporting configuration 1 and reporting configuration 2.

Measurement identifier 3 903 links inter-frequency measurement object 1 with reporting configuration 3. The user equipment reports a measurement result on inter-frequency measurement object 1 if the measurement result meets a reporting condition contained in reporting configuration 1.

Measurement identifier 4 904 links inter-frequency measurement object 2 with reporting configuration 2. The user equipment reports a measurement result on inter-frequency measurement object 2 when the measurement result meets a reporting condition included in reporting configuration 2.

Meanwhile, measurement objects, reporting configurations, and/or measurement identifiers may be added, changed, and/or deleted. This may be indicated by the base station sending a new measurement configuration message or measurement configuration changing message to the user equipment.

Figure 10:
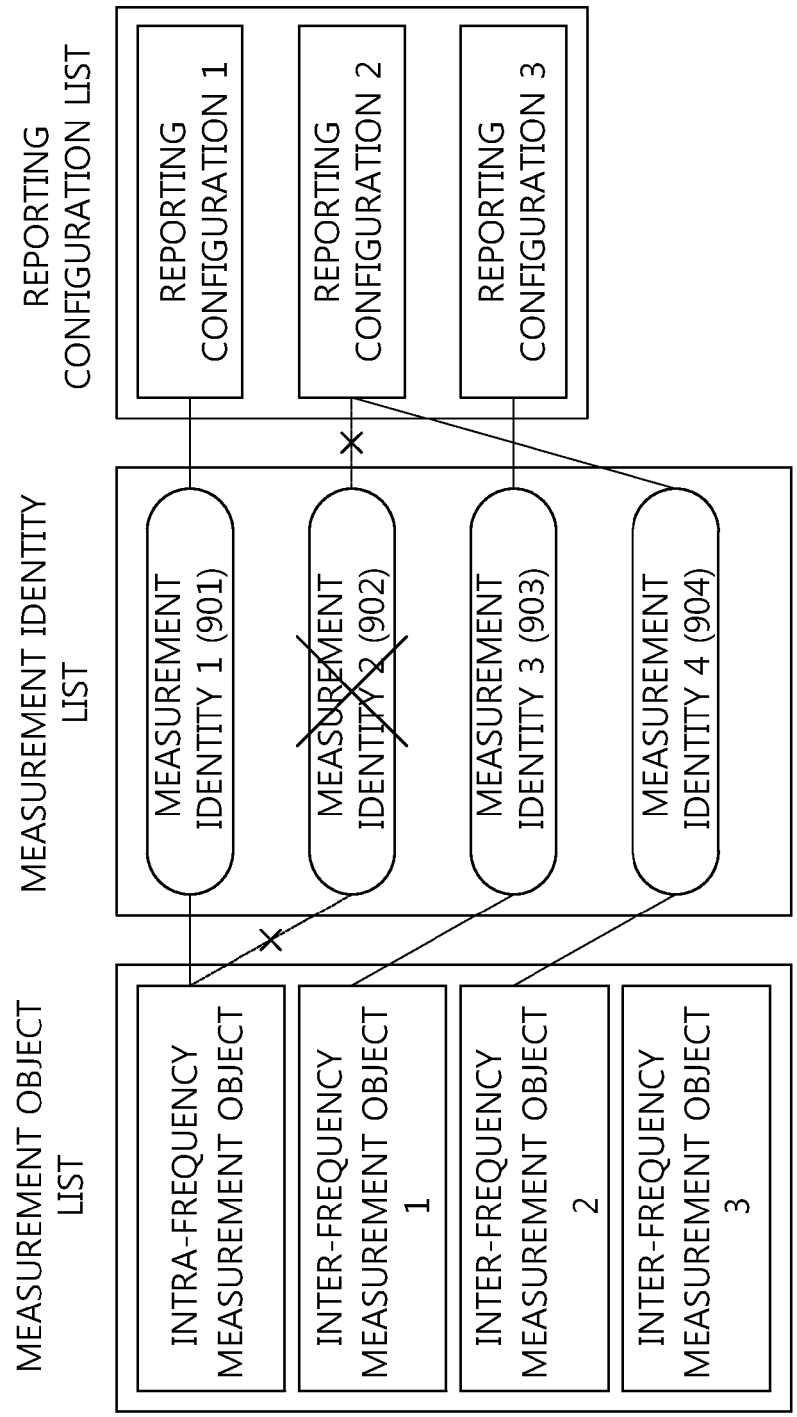
FIG. 10 shows an example of deleting a measurement identifier.

FIG. 10 shows an example of deleting a measurement identifier. If measurement identifier 2 902 is deleted, measurement on the measurement object associated with measurement identifier 2 902 is stopped, and no measurement report is sent out. The measurement object or reporting configuration associated with the deleted measurement identifier might not be changed.

Figure 11:
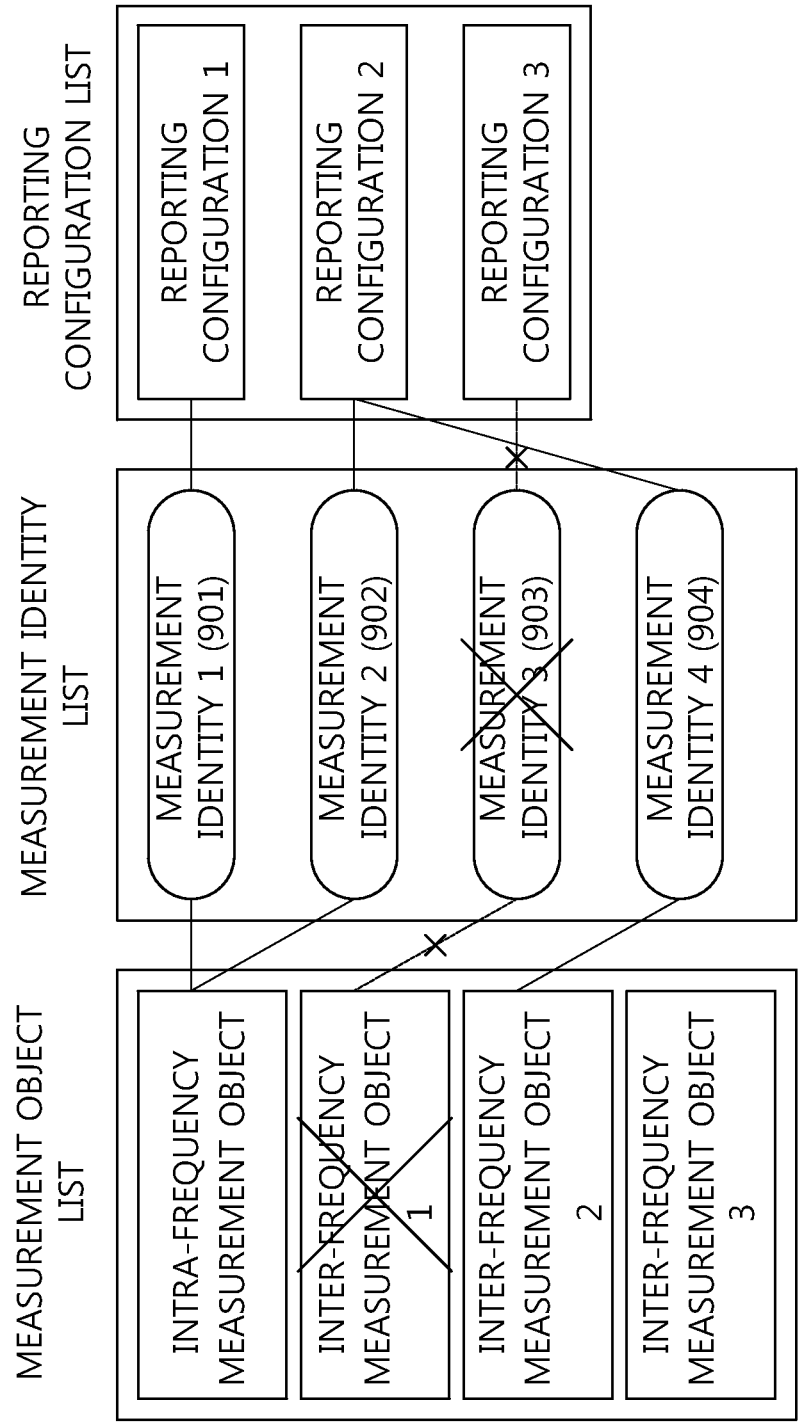
FIG. 11 shows an example of deleting a measurement object.

FIG. 11 shows an example of deleting a measurement object. If inter-frequency measurement object 1 is deleted, the user equipment deletes measurement identifier 3 903 associated thereto, as well. Measurement on inter-frequency measurement object 1 is stopped and no measurement report is sent out. However, the reporting configuration associated with the deleted inter-frequency measurement object 1 might not be varied or deleted.

If a reporting configuration is removed, the user equipment leaves out a measurement identifier associated thereto, as well. The user equipment pauses measurement on the measurement object associated by the associated measurement identifier. However, the measurement object associated with the deleted reporting configuration might not be varied or deleted.

The measurement report may contain a measurement identifier, measured quality of the serving cell, and a measurement result of a neighbor cell. The measurement identifier identifies a measurement object for which a measurement report has been triggered. The measurement result of the neighbor cell may contain the neighbor cell's cell identifier and measured quality. The measured quality may contain at least one of Reference Signal Received Power (RSRP) and Reference Signal Received Quality (RSRQ).

Hereinafter, accessibility measurement is described.

There are many aspects as to coping with non-availability measurement of connection for a user equipment, and this treats all of common channels and connection procedures. To inform a network of non-availability of connection and accordingly help parameter optimization for increasing connection availability, the user equipment conducts accessibility measurement upon failure of connection establishment. In order for accessibility measurement, the user equipment performs the following logging:

A time stamp generated by using a relative timer counting the time between failure and reporting is included. The saving time for accessibility measurement is 48 hours.

Reporting the number of random access preambles transmitted is supported.

Indicating whether to reach the maximum power level is included.

Indicating whether contention is sensed during a random access procedure for connection establishment is included.

Minimization of Driving Tests (MDT) is now described.

MDT is that service providers, instead of conventionally performing a drive test of measuring quality of a cell using a vehicle, allows a user equipment to conduct measurement and report a result of the measurement in order for cell coverage optimization. Coverage may vary the location of a base station, arrangement of ambient buildings, and users' use environment. Accordingly, a service provider needs to periodically conduct a drive test, thus leading to increased costs and resources. To overcome such shortcomings, MDT is proposed in which a service provider measures coverage using his user equipment.

A service provider may prepare for a coverage map representing a service's quality distribution and whether a service is available in the entire service the service provider offers by compiling MDT measurement values received from various user equipments and may put the coverage map to use for operating and optimizing a network. For example, when receiving a coverage problem with a specific area from a user equipment, a service provider may expand coverage of a corresponding local cell by increasing transmit power of a base station servicing the area. By doing so, time and costs for network optimization may be minimized.

MDT is created based on a framework with a tracing function, which is one of an operator's tools for operation, administration, and maintenance (OAM). The tracing function enables the operator to be able to trace a user equipment and log the user equipment's activities, thus allowing for spotting the main cause of malfunctions of the user equipment. Traced data is collected over a network, and this is referred to as trace collection entity (TCE). The operator uses the collected data for the TCE in order for analysis and evaluation. The tracing function used for MDT contains tracing function-based signaling and management. The tracing function-based signaling is used to activate an MDT task towards a specific user equipment, whereas the tracing function-based management is used to activate an MDT task without being limited to a specific user equipment.

MDT may be split into logged MDT and immediate MDT depending on whether the user equipment reports measured and stored log data in real-time or non-real-time. The logged MDT is a scheme in which the user equipment proceeds with MDT measurement and then logs data, then sending it to the network. In contrast, the immediate MDT is a scheme in which the user equipment sends data to the network immediately after performing MDT measurement. According to the logged MDT, the user equipment conducts MDT measurement in the RRC idle state, while according to the immediate MDT, the user equipment conducts MDT measurement in the RRC connected state.

Figure 12:
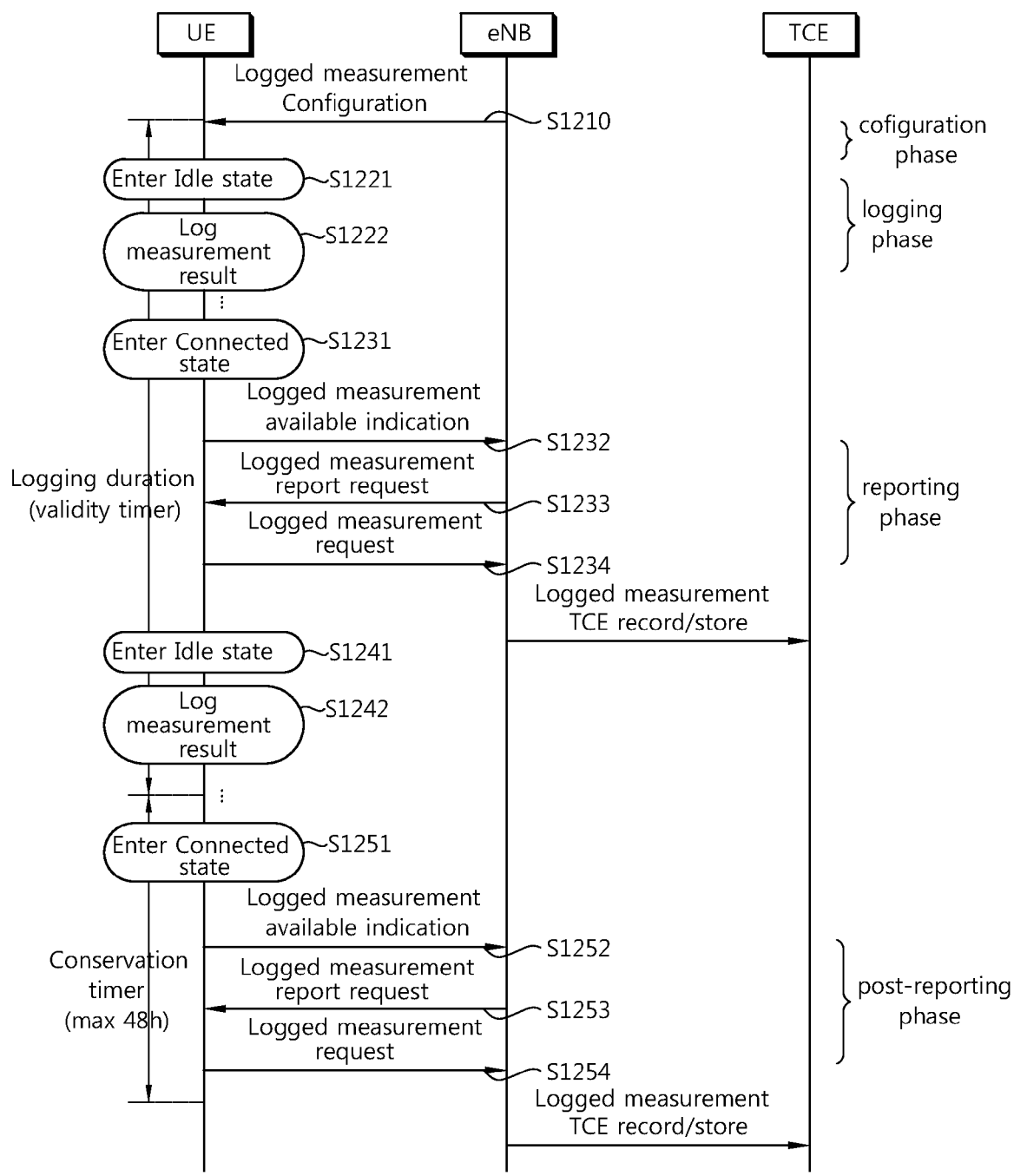
FIG. 12 is a flowchart illustrating a method of performing logged MDT.

FIG. 12 is a flowchart illustrating a method of performing logged MDT.

Referring to FIG. 12, the user equipment receives a logged measurement configuration (S1210). The logged measurement configuration may be included in an RRC message and may be transmitted through a downlink control channel. The logged measurement configuration may contain at least one of a TCE ID, information on a reference time of performing logging, logging duration, a logging interval, and information on an area configuration. The logging interval indicates an interval at which a measurement result is stored. The logging duration indicates duration during which the user equipment performs logged MDT. The reference time indicates a time that is a reference of duration during which logged MDT is conducted. The area configuration indicates an area where the user equipment is requested to conduct logging.

Meanwhile, when receiving the logged measurement configuration, the user equipment initiates a validity timer. The validity timer means lifetime of the logged measurement configuration, and this may be specified by information on the logging duration. The duration of the validity timer may indicate validity of measurement results owned by the user equipment, as well as valid lifetime of the logged measurement configuration.

The procedure in which the user equipment configures logged measurement and various processes are conducted accordingly is referred to as configuration phase.

Upon entry into the RRC idle state (S1221), the user equipment logs the measurement result while the validity timer is being driven (S1222). The measurement result values include an RSRP, an RSRQ, an RSCP (received signal code power), Ec/No, etc. Hereinafter, measurement result-logged information is referred to as logged measurement. The time period during which the user equipment logs a measurement result at least once or more is referred to as logging phase.

The user equipment performing logged MDT based on the logged measurement configuration may vary depending on the location where the user equipment is positioned.

Figure 13:
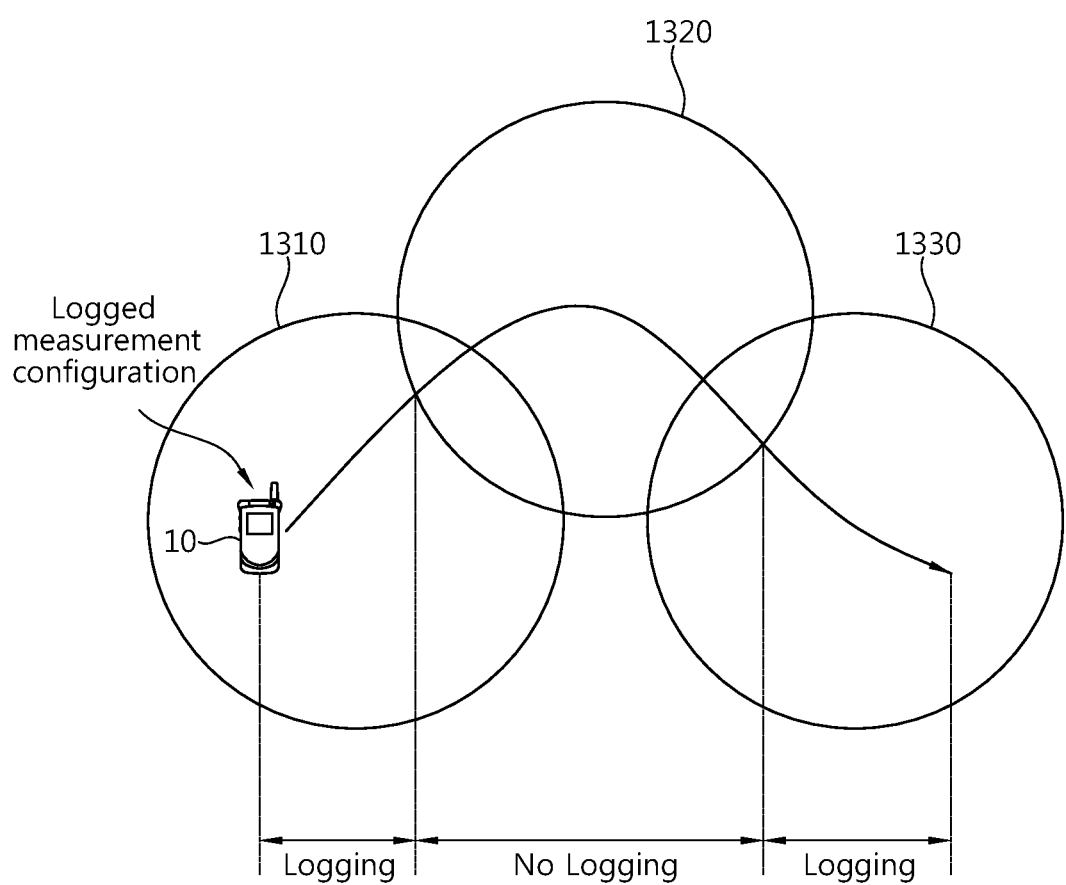
FIG. 13 is a view illustrating an example of logged MDT according to a logging region.

FIG. 13 is a view illustrating an example of logged MDT according to a logging region.

The network may configure a logging region that is an area where the user equipment should do logging. The logging region may be represented as a cell list or as a tracking area/location area list. In case a logging region is set to the user equipment, the user equipment, when departing from the logging region, stops logging.

Referring to FIG. 13, a first region 1310 and a third area 1330 are set as a logging region, and a second area 1320 is an area where logging is not allowed. The user equipment logs in the first area 1310, but not in the second area 1320. The user equipment resumes logging when shifting from the second area 1320 to the third area 1330.

Figure 14:
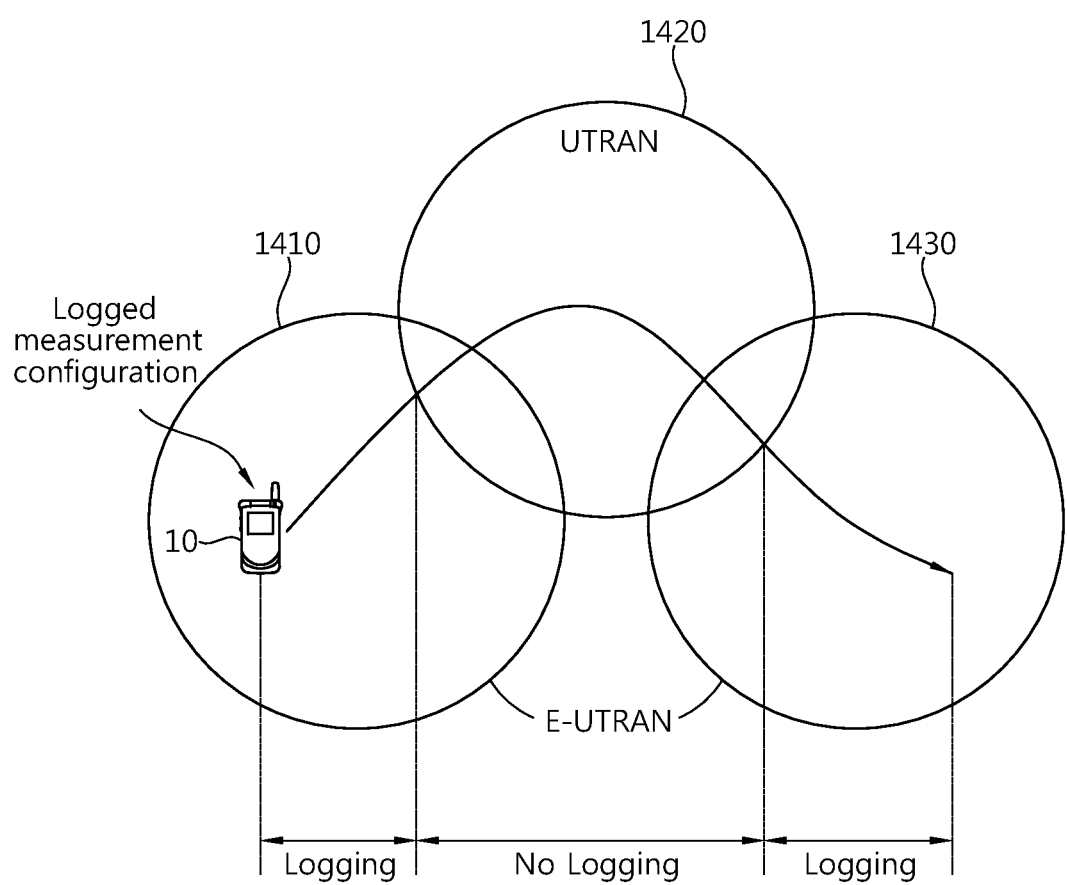
FIG. 14 is a view illustrating an example of logged MDT as an RAT changes.

FIG. 14 is a view illustrating an example of logged MDT as an RAT changes.

The user equipment performs logging only when camping on the RAT that has received a logged measurement configuration, but stops logging in other RATs. However, the user equipment may log cell information of other RATs than the RAT on which the user equipment is camping.

The first area 1410 and the third area 1430 are E-UTRAN areas, and the second area 1420 is a UTRAN area. The logged measurement configuration is received from the E-UTRAN. The user equipment, upon entry into the second area 1420, does not conduct MDT measurement.

Referring back to FIG. 12, the user equipment enters into the RRC connected state (S1231), and in case there is logged measurement to be reported, the user equipment informs the base station that there is logged measurement to be reported (S1232). The user equipment, when RRC connection is established, re-established, or reconfigured, may notify the base station that logged measurement is present. Further, in case the user equipment hands over, the user equipment may inform the handover target cell that logged measurement exists. The user equipment informing the base station that there is logged measurement may be to include a logged measurement availability indicator, which is information indicating that logged measurement is present, in the RRC message that is transmitted from the user equipment to the base station and to send it to the base station. The RRC message may be an RRC connection configuration complete message, an RRC connection reestablishment complete message, an RRC reconfiguration complete message, or a handover complete message.

When receiving a signal indicating that logged measurement is present from the user equipment, the base station requests that the user equipment report logged measurement (S1233). Requesting logged measurement to be reported may be to include a logged measurement report request parameter regarding information indicating the same in an RRC message and to send it out. The RRC message may be a user equipment information request message.

When receiving the request for reporting logged measurement from the base station, the user equipment reports the logged measurement to the base station (S1234). Reporting the logged measurement to the base station may be to include a logged measurement report including logged measurements in an RRC message and to send it to the base station. The RRC message may be a user equipment information report message. The user equipment may report all or some of the logged measurements that the user equipment possesses at the time of reporting. In the case of reporting some of the logged measurements, the reported measurements may be discarded.

As above, the phase where the user equipment informs the base station that there is logged measurement, receives a request for reporting from the base station, and thus conducts a process of reporting logged measurement is referred to as reporting phase.

What is measured by the user equipment while logged MDT is performed is primarily related to wireless environments. MDT measurement may include a cell identifier, cell's signal quality, and/or signal strength. MDT measurement may contain a measurement time and measurement place. The following table provides an example of what is logged by the user equipment.

TABLE 2

| Parameter(set) | Description |
| --- | --- |
| Serving cell identity | Global cell identity of serving cell |
| Measured results of serving cell | Measured Reference Signal Received Power (RSRP) of serving cell<br>Measured Reference Signal Received Quality (RSRQ) of serving cell |
| Measured results of neighbor cell | Cell Identities of measured E-UTRA cells,<br>Measured results of E-UTRA cells<br>Cell Identities of measured UTRA cells,<br>Measured results of UTRA cells<br>Cell Identities of measured GERAN cells,<br>Measured results of GERAN cells<br>Cell Identities of measured CDMA 2000 cells,<br>Measured results of CDMA 2000 cells |
| Time stamp | The moment of logging measurement results, calculated as {current time minus absoluteTimeStamp} in seconds |
| Location information | Detailed location information at the moment of logging |

Information logged at different logging times may be stored to be distinct from each other by different log entries.

Figure 15:
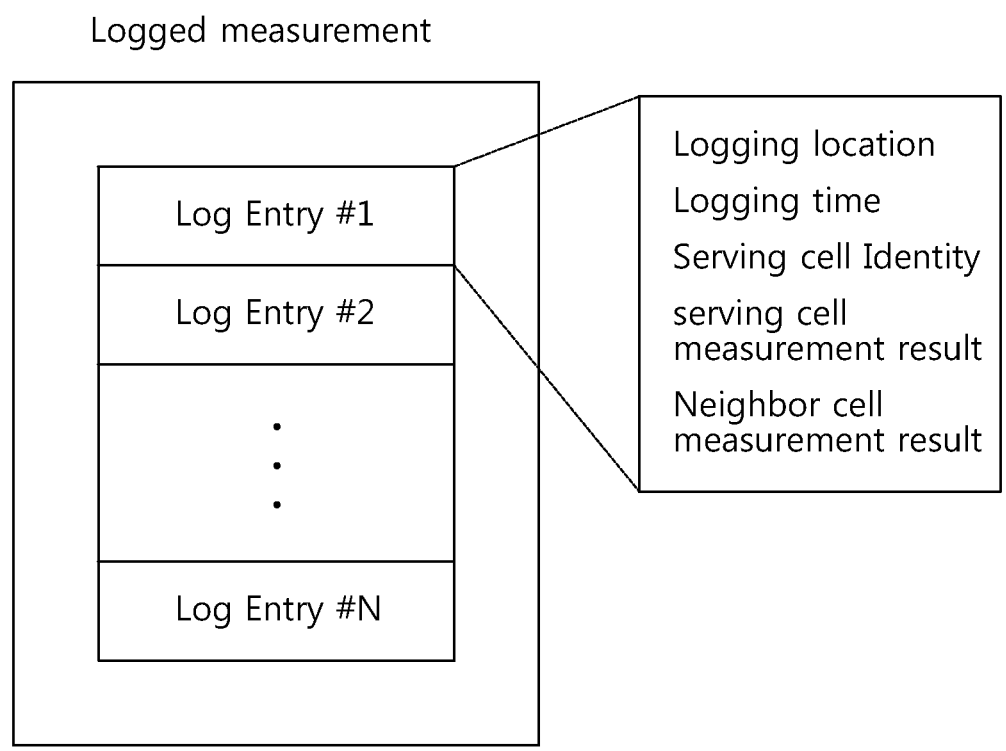
FIG. 15 is a view illustrating an example of logged measurement.

FIG. 15 is a view illustrating an example of logged measurement.

Logged measurement includes one or more entries.

A log entry includes a logging location, a logging time, a serving cell identifier, a serving cell measurement result and a neighbor cell measurement result.

The logging location refers to a location where the user equipment performs measurement. The logging time refers to a time when the user equipment performs measurement. Information logged at different logging times is stored in different log entries.

The serving cell identifier may include a cell identifier at layer 3, which is referred to as Global Cell Identity (GCI). The GCI is a set of a Physical Cell Identity (PCI) and a PLMN identifier.

Meanwhile, the user equipment may analyze and log the user equipment's performance-related indexes in addition to the wireless environment. For example, a throughput (an erroneous transmission/reception rate may be included).

Referring back to FIG. 12, the above-described logging phase and reporting phase may be provided multiple times within the logging duration (S1241, S1242).

When receiving the logged measurement, the base station may record/store the logged measurement in the TCE.

In case the user equipment owns logged measurement reported yet after the validity timer expires, i.e., after the logging duration elapses, the user equipment conducts a procedure for reporting this to the base station. The phase during which various procedures for the same is referred to as post-reporting phase.

The user equipment discards the logged measurement configuration after the logging duration expires and initiates a conservation timer. After the logging duration expires, the user equipment stops MDT measurement. However, measurement that has been already logged is kept without being discarded. The conservation timer indicates the lifetime of the remaining logged measurement.

If the user equipment enters into the RRC connected state before the conservation timer expires (S1251), the logged measurement that is not reported yet may be reported to the base station. In such case, the above-described procedures for reporting the logged measurement may be conducted S1252, S1253, and S1254). If the conservation timer expires, the remaining logged measurement may be discarded. The base station, when receiving the logged measurement, may record/store it in the TCE.

The conservation timer may be fixed to the user equipment as a predetermined value and may be previously set to the user equipment. For example, the value of the conservation timer may be 48 hours. Or, the value of the conservation timer may be delivered to the user equipment, included in the logged measurement configuration or in other RRC message.

Meanwhile, if a new logged measurement configuration is delivered to the user equipment, the user equipment may update the existing logged measurement configuration with the newly obtained logged measurement configuration. In such case, the validity timer may restart from the time when the logged measurement configuration is newly received. Further, the logged measurement based on the previous logged measurement configuration may be discarded.

Figure 16:
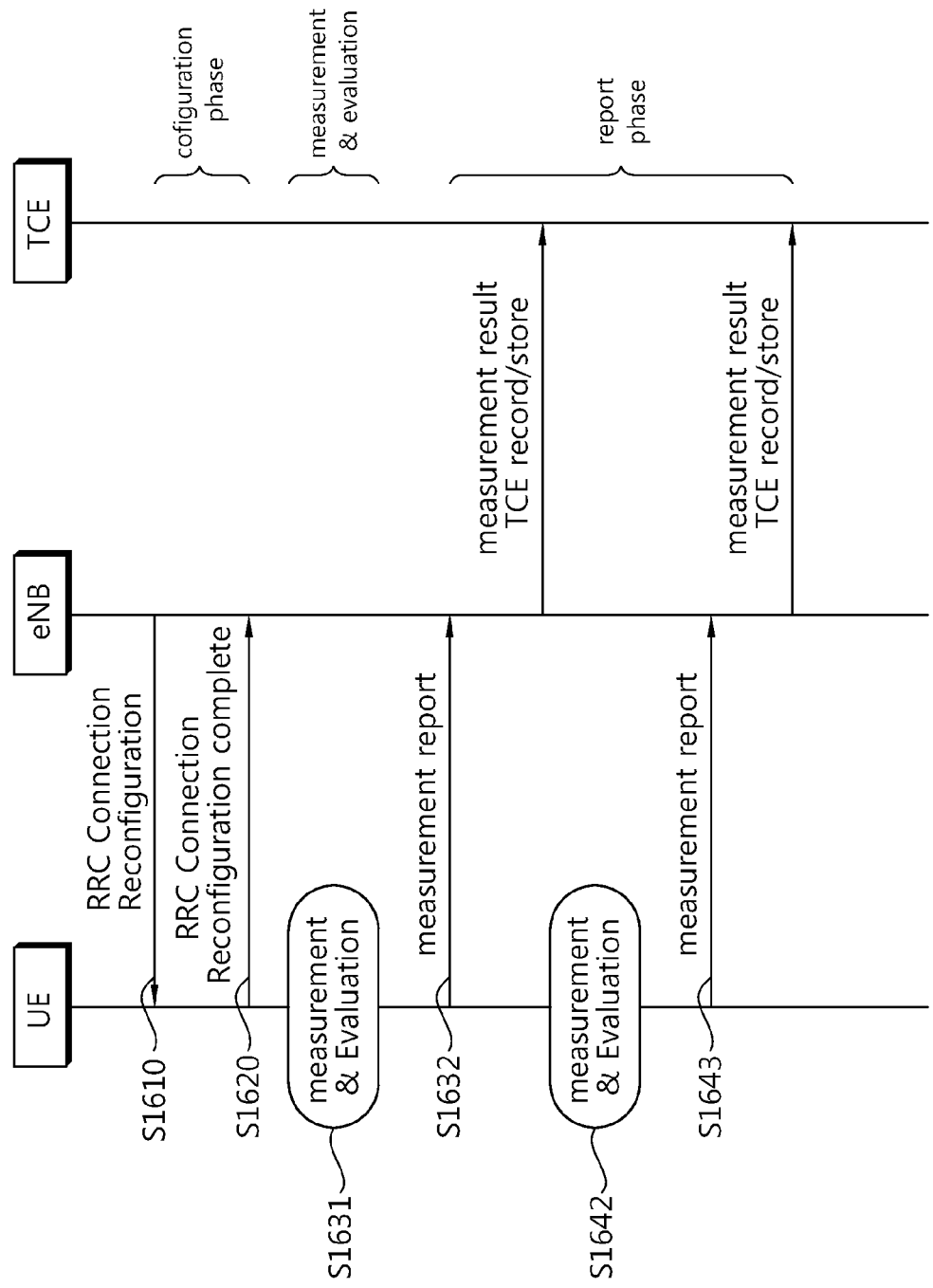
FIG. 16 is a view illustrating an example of immediate MDT.

FIG. 16 is a view illustrating an example of immediate MDT. The immediate MDT is based on RRM measurement and reporting mechanism and may add location-related information upon reporting measurement, and may send the information to the base station.

Referring to FIG. 16, the user equipment receives an RRC connection reconfiguration message (S1610) and sends an RRC connection re-establishment complete message (S1620). By doing so, the user equipment enters into an RRC connected state. The user equipment may receive a measurement configuration by receiving the RRC connection reconfiguration message. The measurement configuration in the example described in connection with FIG. 16 is received through the RRC connection reconfiguration message, but this may be also included in other RRC message and sent.

The user equipment conducts measurement and evaluation in the RRC connected state (S1631) and reports a measurement result to the base station (S1632). In the immediate MDT, the measurement result may offer exact location information like in the example of the global navigation satellite system (GNSS) location information, as possible. Neighbor cell measurement information may be provided which may be used to determine the user equipment's location in order for location measurement, such as an RF fingerprint.

It can be seen in FIG. 16 that even after the measurement and evaluation (S1631) and reporting (S1632) that were performed first, the user equipment conducts measurement and evaluation (S1641) and then report a measurement result to the base station immediately (S1642). This is the greatest difference between the logged MDT and immediate MDT.

Hereinafter, positioning methods are described.

E-UTRAN supports positioning methods such as network-assisted GNSS method, downlink positioning method, enhanced cell ID (E-CID) method, and uplink positioning method and a hybrid positioning method in which one or more of the above-listed methods apply at the same time.

The network-assisted GNSS method is based on a user equipment equipped with a radio receiver that may receive a GNSS signal. The GNSS includes a Global Positioning system (GPS), a Galileo, a Global Navigation Satellite System (GLONASS), an Space Based Augmentation Systems (SBAS), and Quasi Zenith Satellite System (QZSS). According to the network-assisted GNSS method, when other GNSSs determine the location of the UE, each may be used alone or in combination with at least one system.

The downlink positioning method, also called Observed Time Difference of Arrival (OTDOA), is based on the timing measured on downlink signals received by the user equipment from a plurality of eNBs. The user equipment measures the timing of signals received using assistance data received from a positioning server. The measurement results are used to determine the user equipment's location as compared with neighbor eNBs.

In the cell ID (CID) positioning method, the user equipment's location is estimated based on the user equipment's serving eNB and serving cell's knowledgement. Information on the serving eNB and serving cell may be obtained by paging, updating tracking area or other methods. The E-CID positioning method means a technology using an additional user equipment and/or other measurement than that applying to the E-UTRAN radio resources in order to enhance UE location estimation.

Although the E-CID positioning method partially utilizes the same measurement like in the measurement control system over an RRC protocol, the user equipment is not expected to be performing additional measurement only for positioning, typically. For example, no separate measurement configuration or measurement control message is offered for positioning, and the user equipment reports its valid measurement that it now has, rather than being required to take additional measurement actions.

If the user equipment has valid detailed location information when reporting a measurement result to the network, the user equipment may report the same together with the measurement result. In order to generate location information, the user equipment may initiate a positioning procedure. However, operating a positioning procedure may cause the user equipment severe power consumption. Accordingly, a method is demanded to be able to optimize the relationship between obtaining valid location information and reducing power consumption due to positioning.

In order to achieve the above objects, the user equipment may enable positioning to be selectively performed. Specifically, the user equipment may activate or deactivate positioning. Deactivating positioning means that, in case the user equipment sends out a reporting message such as measurement result and/or RLF report, the user equipment does not conduct a series of operations for obtaining location information associated with, e.g., RLF sensing and/or measurement result.

Activating/deactivating positioning may be performed based on the state of a service offered to the user equipment. In general, in case service quality is good, the user equipment may deactivate positioning, and in case the service quality is poor, the user equipment may activate positioning. As an example, in performing measurement for MDT and reporting measurement results, a measurement result indicating that the measured quality is not good may have higher importance than a measurement result indicating that the measured quality is good in view of operating a network. Accordingly, in case the measured quality is not good, the user equipment may activate positioning and report a measurement result and its related location information to the network.

Figure 17:
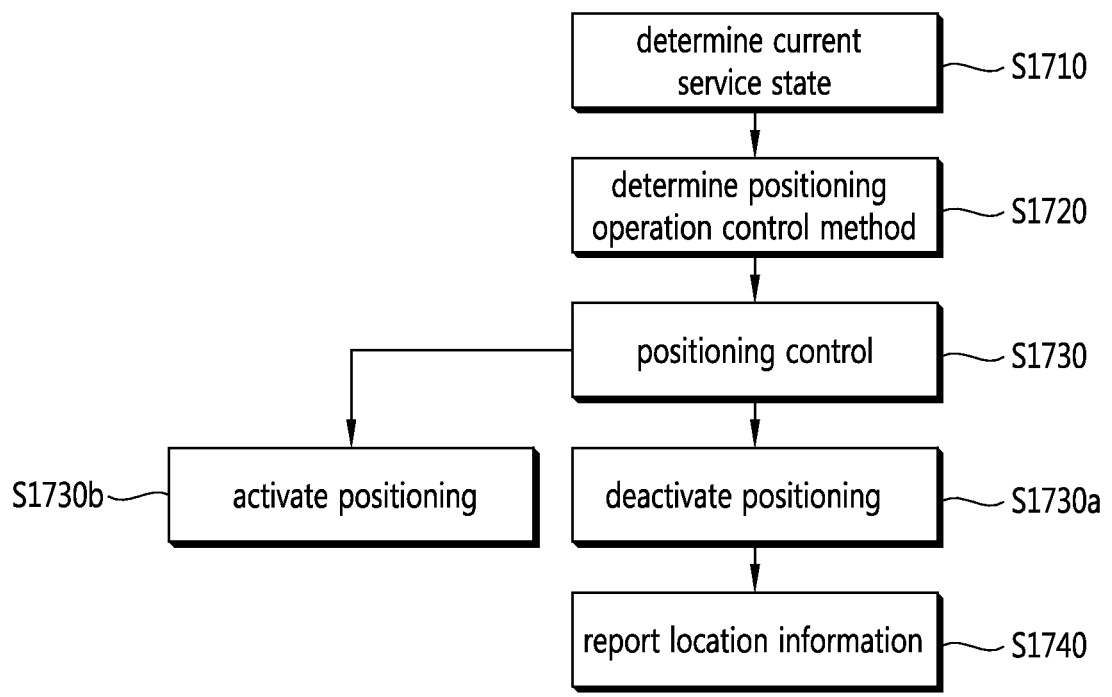
FIG. 17 is a flowchart illustrating a selective positioning operation method according to an embodiment of the present invention.

FIG. 17 is a flowchart illustrating a selective positioning operation method according to an embodiment of the present invention.

Referring to FIG. 17, the user equipment determines a current service state (S1710). Determining a service state may be that the user equipment measures the quality of a current serving cell. Determining a service state may be that the user equipment senses a physical layer problem. Determining a service state may be that the user equipment senses a radio link failure. Determining a service state may be that the user equipment senses a specific result on attempt of RRC connection.

The user equipment determines how to control a positioning operation based on the service state (S1720). A specific method of the user equipment controlling the positioning operation may be performed as follows.

1) Serving Cell's Quality-Based Control

The user equipment may perform measurement on a serving cell and may control positioning operation based on the measured quality of the serving cell. A serving cell quality-based positioning operation control mechanism is run by comparing the serving cell's quality with a specific threshold. In case the serving cell's quality is higher than the specific threshold, the user equipment may deactivate positioning. In case the serving cell's quality is lower than the specific threshold, the user equipment may activate positioning. The threshold may be signaled from the network. During the course of the comparison, a specific hysteresis value may apply. The threshold and/or hysteresis value may be offered alongside information necessary for the user equipment to perform measurement, such as measurement configuration or logged measurement configuration.

(2) Physical Layer State-Based Control

The user equipment may control positioning operation based on the physical layer state. The user equipment's physical layer may monitor the downlink radio link quality of a PCell through radio link monitoring. In case the radio link quality is lower than a specific threshold, the physical layer may indicate 'out-of-sync' as an upper layer, and in this case, the user equipment may sense that a physical layer problem has occurred. If the physical layer problem is sensed, the user equipment may activate positioning. Further, the user equipment's physical layer may indicate 'in-sync' as an upper layer in case the radio link quality is higher than the specific threshold, and in this case, the user equipment may sense that the physical layer problem has been removed. If the sensed physical layer problem is eliminated, the user equipment may deactivate the activated positioning.

3) RLF-Related Control

As described earlier, the user equipment may sense an RLF, and based on whether to the RLF is sensed, positioning operation may be controlled. The user equipment may activate positioning in case the RLF is sensed.

4) Accessibility Measurement-Related Control

In case a procedure for RRC connection re-establishment has been tried but failed, the user equipment may activate positioning. Meanwhile, in case the user equipment is successfully linked to the network (in case a procedure for establishing RRC connection has been successfully performed), the user equipment may deactivate positioning.

The user equipment controls positioning according to the determined positioning operation control method (S1730). The user equipment controlling the positioning operation may include the operation of activating positioning (S1730a) or deactivating positioning (S1730b).

In case the user equipment activates positioning, the user equipment may include the location information in the report message such as measurement report and/or RLF report and send it to the network (S1750).

Meanwhile, positioning operation may be realized in more split detailed modes than being split into two modes of activation and deactivation. Positioning operation may be implemented in the deactivation mode and in various activation modes associated with accuracy of the location information that may be obtained. Implementing various activation modes may be stepwise embodied according to accuracy of the location information obtained and power consumption that arises as the positioning-related operation is performed. As an example, it may be separated into a first positioning mode set to consume relatively less power while obtaining relatively low accuracy of location information and a second positioning mode set to consume relatively more power while obtaining relatively high accuracy of location information.

The accuracy of the location information may be determined by positioning performance itself. In other words, the positioning performed in the second positioning mode may be better in performance than the positioning performed in the second positioning mode.

The accuracy of the location information may be related to the frequency of positioning that is performed. RLF sensing, RLM, MDT, and measurement by the user equipment may be performed independently from positioning. Accordingly, in case positioning is conducted frequently, location information having higher relevance with the physical layer problem, RLF sensed at a specific time, or measurement result at a specific time may be acquired. For example, in the second positioning mode, positioning may be configured to obtain location information more frequently than in the first positioning mode.

The above-described various positioning activation modes may effectively apply when positioning operation is controlled based on the serving cell's quality. By way of example, in case the serving cell quality is a first threshold or higher, the user equipment may deactivate positioning. If the serving cell's quality is lower than the first threshold and higher than the second threshold, the user equipment may activate positioning operation to operate in the first positioning mode. In case the serving cell's quality is rendered lower than the second threshold, the user equipment may activate the positioning operation to operate in the second positioning mode.

A reporting method with selective positioning is now described with reference with the drawings.

Figure 18:
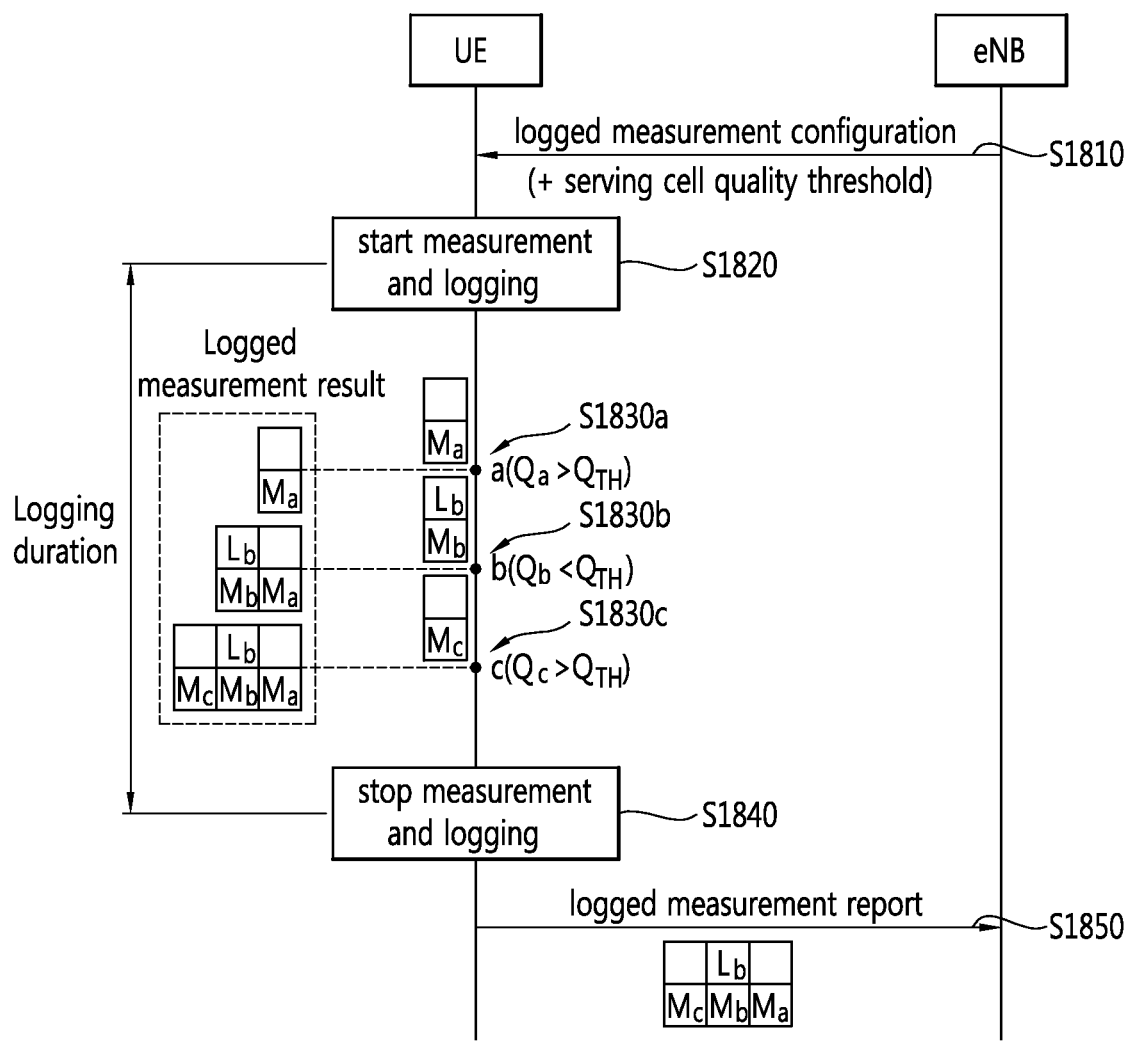
FIG. 18 is a flowchart illustrating an example of a method of performing logged MDT, with selective positioning, according to an embodiment of the present invention.

FIG. 18 is a flowchart illustrating an example of a method of performing logged MDT, with selective positioning, according to an embodiment of the present invention. The positioning mode applying to this example is assumed to be split into activation and deactivation.

Referring to FIG. 18, the user equipment receives a logged measurement configuration from the base station (S1810). The logged measurement configuration contains information for performing logged MDT like the logged measurement configuration described above in connection with FIG. 12. The logged measurement configuration may further contain a threshold ($Q_{TH}$) that is compared with the quality of serving cell by the user equipment for controlling positioning operation.

The user equipment starts measurement and logging from a logging start time indicated by the logged measurement configuration (S1820). The user equipment may perform measurement and logging at each logging interval.

The user equipment conducts measurement and logging at time a (S1830a). The quality ($Q_s$) of the serving cell at time a may be seen to be better than the threshold ($Q_{TH}$). Accordingly, the user equipment may log a measurement result without activating positioning. In this case, a log entry at time a may contain the measurement result ($M_a$).

The user equipment performs measurement and logging at time b (S1830b). It can be seen that the quality ($Q_b$) of the serving cell at time b is worse than the threshold ($Q_{TH}$). Accordingly, the user equipment may activate positioning and obtain location information ($L_b$) at the time. The user equipment logs the measurement result ($M_b$) and location information ($L_b$).

The user equipment performs measurement and logging at time c (S1830c). It can be seen that the quality ($Q_c$) of the serving cell at time c is better than the threshold ($Q_{TH}$). Accordingly, the user equipment may deactivate positioning and log a measurement result. In this case, a log entry at time c may contain the measurement result ($M_c$).

If the logging duration elapses, the user equipment stops measurement and logging (S1840).

The user equipment reports the logged measurement to the network (S1850). In this example, the user equipment is assumed to approach an existing serving cell after entering into the RRC connected state, and accordingly, the user equipment reports the logged measurement to the base station. The base station, when receiving the logged measurement, may record/store this in the TCE.

Meanwhile, in the logged measurement as shown in FIG. 18, positioning may be supported in the above described various modes. It is assumed that the user equipment obtains location information according to the second positioning mode after starting measurement and logging. Further, assume that $Q_s$ is lower than $Q_{TH1}$, $Q_b$ is higher than $Q_{TH2}$, $Q_c$ is higher than $Q_{TH1}$ and lower than $Q_{TH2}$. It is assumed that if the quality of the serving cell is higher than $Q_{TH2}$, positioning is deactivated, if the quality is higher than $Q_{TH1}$ and lower than $Q_{TH2}$, location information is obtained according to the first positioning mode, and if the quality is lower than $Q_{TH1}$, location information is obtained according to the second positioning mode.

Since the quality of the serving cell at time a is lower than $Q_{TH1}$, the user equipment may acquire location information according to the second positioning mode. In this case, the user equipment may obtain location information with high accuracy by acquiring location information frequently or through high-performance positioning. At time b, the quality of the serving cell is higher than $Q_{TH2}$, and thus, the user equipment may deactivate the positioning. Since at time c, the quality of the serving cell is higher than $Q_{TH1}$ and lower than $Q_{TH2}$, the user equipment may acquire location information according to the first positioning mode. In this case, the user equipment may obtain location information less frequently than it does somewhere between time a and time b or may acquire location information with lower accuracy than the location information obtained at time a.

Meanwhile, after the user equipment initiates measurement and logging, the initial positioning mode may be signaled through additional signaling information included in the logged measurement configuration.

In the above-described example where various positioning modes are offered, the number of thresholds provided through the logged measurement configuration may vary depending on the degree of separation of the positioning mode.

Turning back to FIG. 18, when reported with the logged measurement, the network may be aware that the quality of the serving cell is not good at time b, and may grasp its corresponding location through the location information ($L_b$). Accordingly, the network may control its operation considering that the quality of the serving cell at the corresponding location is not good. The location information $L_a$ and $L_c$ at times a and c when the quality of service provided to the user equipment is relatively good may have relatively low importance as compared with $L_b$ in view of operating the network. Accordingly, even when the location information at the corresponding time is not provided by positioning deactivation, there may be no or little influence in light of network operation and performance. In contrast, the user equipment may save power consumption due to the positioning deactivated at times a and c. Accordingly, the user equipment's operational flexibility may be raised more.

Figure 19:
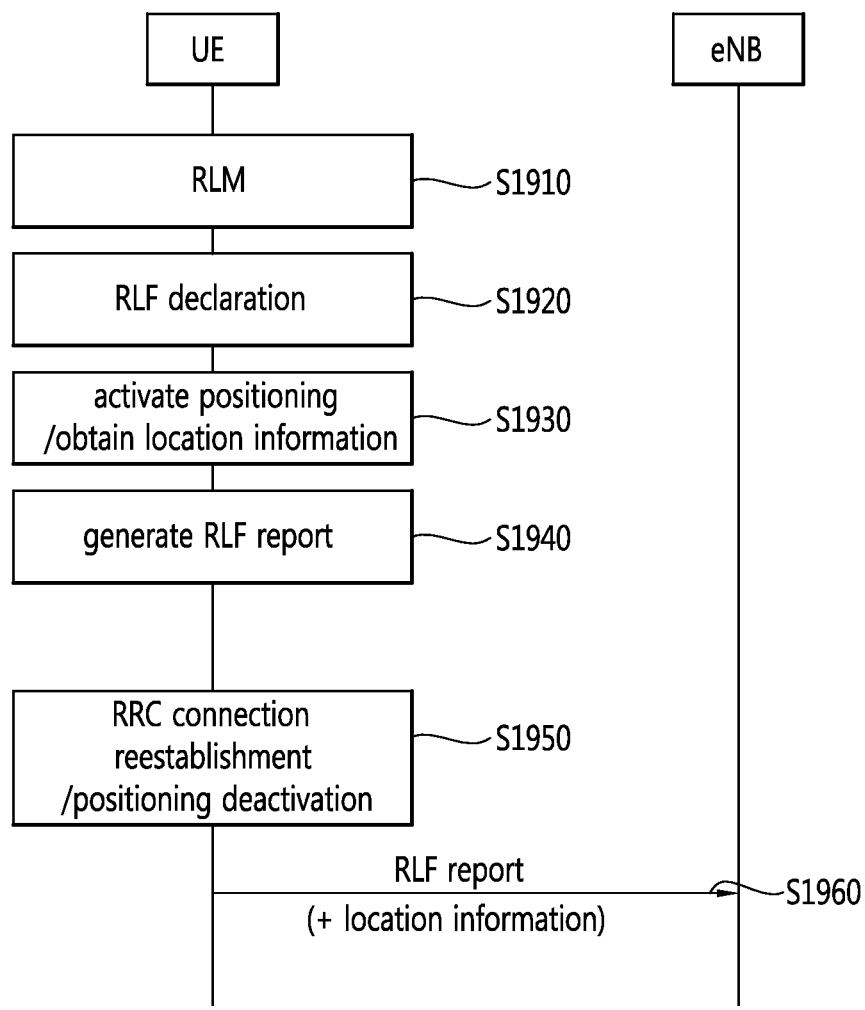
FIG. 19 is a flowchart illustrating an example of an RLF reporting method with selective positioning according to an embodiment of the present invention.

FIG. 19 is a flowchart illustrating an example of an RLF reporting method with selective positioning according to an embodiment of the present invention.

Referring to FIG. 19, the user equipment conducts RLM (S1910).

When sensing an RLF while performing RLM, the user equipment declares the RLF (S1920).

The user equipment activates positioning corresponding to sending the RLF and obtains location information (S1930).

The user equipment generates an RLF report corresponding to sensing the RLF (S1940). Information contained in the RLF report may be implemented as set forth above. Among others, information related to a failure location may be location information that is obtained as the user equipment activates positioning.

The user equipment performs an RRC connection re-establishment procedure and deactivates the positioning (S1950).

Subsequently, the user equipment sends the RLF report to the base station of the cell to which the user equipment gains access.

As above, the user equipment activates positioning in order to obtain information on the sensed location when the RLF is sensed. Further, in case the RLF is recovered so that the user equipment enters into the RRC connected mode, positioning may be turned back into deactivation. By doing so, the user equipment selectively activate/deactivate positioning as necessary, thus saving power consumed for an operation for positioning.

According to an embodiment of the present invention, the user equipment may selectively activate or deactivate positioning as necessary or may control a positioning mode. Accordingly, at the time when location information is determined to be needed, location information may be obtained, while at the time when no location information is determined to be needed, positioning for obtaining location information might not be conducted. Or, depending on the service state, positioning for acquiring exact location information may be conducted or other mode of positioning for obtaining relatively brief location information may be done. Thus, the user equipment may save power consumed for obtaining location information depending on circumstances, and this may result in more flexible operation of the user equipment. Further, the location information reported to the network may be guaranteed for its accuracy depending on service states, so that although the frequency or performance of positioning is deteriorated, the operational performance of the network may be expected to be maintained.

Figure 20:
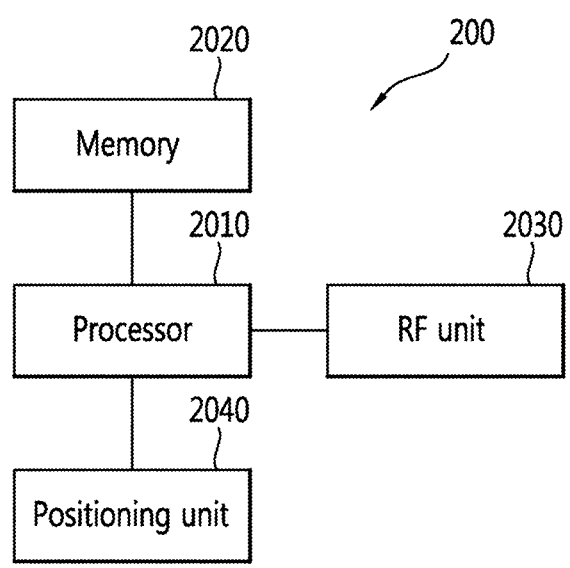
FIG. 20 is a block diagram illustrating a wireless device where an embodiment of the present invention may be implemented.

FIG. 20 is a block diagram illustrating a wireless device where an embodiment of the present invention may be implemented. This wireless device may realize the user equipment's operations in the embodiments described above in connection with FIGS. 17 to 19.

The wireless device 2000 includes a processor 2010, a memory 2020, an RF (radio frequency) unit 2030, and a positioning unit 2040.

The processor 2010 embodies a function, process, and/or method as suggested herein. The processor 2010 may be configured to determine a service state. The processor 2010 may be configured to determine a positioning operation control method based on the determined service state. The processor 2010 may be configured to control the positioning unit so that the positioning mode is operated according to the control method. The processor 2010 may be configured to be able to obtain location information through a downlink positioning method, an E-CID positioning method, and/or an uplink positioning method. The processor 2010 may acquire location-related information of the wireless device from the positioning unit 2040 that has received the location information. Obtaining and reporting location information which are performed by the processor 2010 may be implemented to be applicable to various reporting mechanisms that are fulfilled by the user equipment in the wireless communication system, such as measurement report, logged measurement report, and radio link failure report. The embodiments described above in connection with FIGS. 17 to 19 may be realized by the processor 2010 and the memory 2020.

The RF unit 2030 is connected with the processor 2010 and sends and receives radio signals.

The positioning unit 2040 may be configured to obtain location information by sending and receiving signals according to a system other than a wireless communication system. The positioning unit 2040 may be implemented to support GNSS.

The processor 2010 may include an ASIC (application-specific integrated circuit), other chipset, a logic circuit, and/or a data processing device. The memory 2020 may include an ROM (read-only memory), an RAM (random access memory), a flash memory, a memory card, a storage medium, and/or other storage devices. The RF unit 2030 may include a baseband circuit for processing radio signals. When an embodiment is implemented in software, the above-described schemes may be realized in modules (processes, functions, etc.) for performing the above-described functions. The modules may be stored in the memory 2020 and executed by the processor 2010. The memory 2020 may be positioned in or outside the processor 2010 and may be connected with the processor 2010 via various well-known means.

Although in the above exemplary systems, the methods are described based on a series of steps or blocks, the present invention is not limited to the order of the steps, and some steps may be performed in an order different from other steps or simultaneously with the other steps. Further, it is apparent to one of ordinary skill in the art that the steps in the flowcharts do not exclude each other and rather other steps may be added or one or more steps may be deleted from the flowcharts without affecting the scope of the present invention.

What is claimed is:

1. A reporting method in a wireless communication system, the reporting method comprising:
    receiving a measurement configuration, from a network, including information for performing a measurement, wherein the measurement configuration includes a plurality of thresholds;
    determining a service state by measuring a quality of a serving cell;
    controlling positioning for obtaining location information depending on the service state;
    obtaining information on a location of a user equipment depending on a positioning mode determined by the control; and
    reporting the obtained location information to the network,
    wherein the positioning mode is deactivated when the quality of the serving cell is greater than a first threshold of the plurality of thresholds,
    wherein the positioning mode includes a first positioning mode and a second positioning mode,
    wherein the first positioning mode is activated when the quality of the serving cell is less than the first threshold but greater than a second threshold of the plurality of thresholds,
    wherein the second positioning mode is activated when the quality of the serving cell is less than the second threshold, and
    wherein the first threshold is greater than the second threshold.

2. The reporting method of claim 1, wherein the obtaining the information on the location of the user equipment depending on the determined positioning mode is performed when the positioning mode is activated.

3. The reporting method of claim 2, wherein the obtained location of the user equipment is logged alongside the measurement result and is reported to the network.

4. The reporting method of claim 1, further comprising monitoring a downlink quality.

5. The reporting method of claim 4, wherein the determining the service state includes sensing an occurrence of a radio link failure based on the monitoring.

6. The reporting method of claim 5, wherein the controlling the positioning includes activating the positioning when the radio link failure is sensed.

7. The reporting method of claim 6, wherein the determining the service state further includes determining that the user equipment recovers from the radio link failure when the user equipment performs RRC (Radio Resource Control) connection reestablishment.

8. The reporting method of claim 7, wherein the controlling the positioning includes deactivating the positioning mode when determining recovery from the radio link failure.

9. The reporting method of claim 8, further comprising sending, to the network, a radio link failure report reporting that the radio link failure is sensed,
    wherein the radio link failure report includes the information on the location of the user equipment.

10. A wireless device operating in a wireless communication system, the wireless device comprising:
    an RF (radio frequency) unit transmitting and receiving a radio signal; and
    a processor operatively connected with the RF unit, the processor configured to:
    receive a measurement configuration including information for performing a measurement, wherein the measurement configuration includes a plurality of thresholds;
    determine a service state by measuring a quality of a serving cell;
    control positioning for obtaining location information depending on the service state;
    obtain information on a location of a user equipment depending on a positioning mode determined by the control; and
    report the obtained location information to a network,
    wherein the positioning mode is deactivated when the quality of the serving cell is greater than a first threshold of the plurality of thresholds,
    wherein the positioning mode includes a first positioning mode and a second positioning mode,
    wherein the first positioning mode is activated when the quality of the serving cell is less than the first threshold but greater than a second threshold of the plurality of thresholds,
    wherein the second positioning mode is activated when the quality of the serving cell is less than the second threshold, and
    wherein the first threshold is greater than the second threshold.

11. The wireless device of claim 10, wherein the obtained location of the user equipment is logged alongside the measurement result and is reported to the network.

* * * * *